US010145936B2

(12) United States Patent
Kishigami et al.

(10) Patent No.: US 10,145,936 B2
(45) Date of Patent: Dec. 4, 2018

(54) RADAR DEVICE

(71) Applicant: Panasonic Corporation, Osaka (JP)

(72) Inventors: Takaaki Kishigami, Tokyo (JP);
Ryosuke Shiozaki, Tokyo (JP)

(73) Assignee: Panasonic Corporation, Osaka (JP)

( * ) Notice: Subject to any disclaimer, the term of this patent is extended or adjusted under 35 U.S.C. 154(b) by 301 days.

(21) Appl. No.: 15/066,679

(22) Filed: Mar. 10, 2016

(65) Prior Publication Data
US 2016/0282450 A1 Sep. 29, 2016

(30) Foreign Application Priority Data
Mar. 25, 2015 (JP) ................. 2015-061980

(51) Int. Cl.
*G01S 7/285* (2006.01)
*G01S 13/93* (2006.01)
*G01S 7/282* (2006.01)
*G01S 7/288* (2006.01)
*G01S 13/26* (2006.01)
(Continued)

(52) U.S. Cl.
CPC .............. *G01S 7/285* (2013.01); *G01S 7/282* (2013.01); *G01S 7/288* (2013.01); *G01S 13/26* (2013.01); *G01S 13/284* (2013.01); *G01S 13/286* (2013.01); *G01S 13/426* (2013.01); *G01S 13/931* (2013.01); *G01S 2007/2886* (2013.01)

(58) Field of Classification Search
CPC .... G01S 13/003; G01S 13/878; G01S 7/4056; G01S 13/06; G01S 13/88; G01S 2013/0263; G01S 7/352; G01S 2013/0254; H01Q 1/3233; H01Q 9/0407; H01Q 21/061; H01Q 21/06; H01Q 25/00; H01Q 21/08; H01Q 21/22; H01Q 21/28
See application file for complete search history.

(56) References Cited

U.S. PATENT DOCUMENTS

| 8,427,360 B2 * | 4/2013 | Longstaff .............. G01S 13/882 340/945 |
| 8,570,210 B1 * | 10/2013 | Fonder .................... G01S 13/02 342/25 B |
| 9,910,150 B2 * | 3/2018 | Schoor .................. G01S 13/931 |

(Continued)

FOREIGN PATENT DOCUMENTS

JP 2014-085317 5/2014

OTHER PUBLICATIONS

Jian Li, et al., "MIMO Radar with Colocated Antennas" Signal Processing Magazine, IEEE vol. 24, Issue: 5, pp. 106-114, Sep. 2007.

*Primary Examiner* — Olumide Ajibade Akonai
(74) *Attorney, Agent, or Firm* — Seed IP Law Group LLP

(57) ABSTRACT

Nt transmitting antennas include Nt1 (Nt>Nt1) transmitting antennas arranged on a first straight line at a first spacing, and (Nt+1−Nt1) transmitting antennas arranged on a second straight line at a second spacing in a direction orthogonal to the Nt1 transmitting antennas, where Nt1 is a value that maximizes Nt1×(Nt+1−Nt1). Na receiving antennas include Na1 (Na>Na1) receiving antennas arranged on the first straight line at a third spacing, and (Na+1−Na1) receiving antennas arranged on the second straight line at a fourth spacing in a direction orthogonal to the Na1 receiving antennas, where Na1 is a value that maximizes Na1×(Na+1−Na1).

4 Claims, 21 Drawing Sheets

(51) Int. Cl.
    *G01S 13/28*    (2006.01)
    *G01S 13/42*    (2006.01)

(56) References Cited

U.S. PATENT DOCUMENTS

| | | | | |
|---|---|---|---|---|
| 2010/0141527 A1* | 6/2010 | Lalezari | .................. | H01Q 21/08 342/368 |
| 2010/0328157 A1* | 12/2010 | Culkin | .................. | H01Q 21/061 342/372 |
| 2011/0221625 A1* | 9/2011 | Cornic | .................. | G01S 13/424 342/29 |
| 2012/0146844 A1* | 6/2012 | Stirling-Gallacher | ....................... | G01S 13/34 342/189 |
| 2013/0113652 A1* | 5/2013 | Smits | .................... | G01S 7/4004 342/174 |
| 2015/0204972 A1* | 7/2015 | Kuehnle | ............... | G01S 13/931 342/156 |

* cited by examiner

FIG. 14A
FIG. 14B
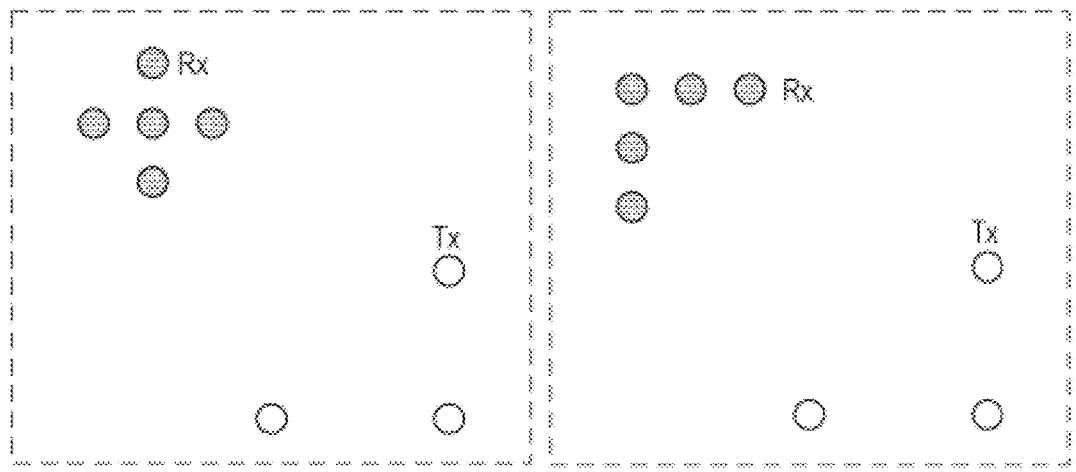
FIG. 14C
FIG. 14D
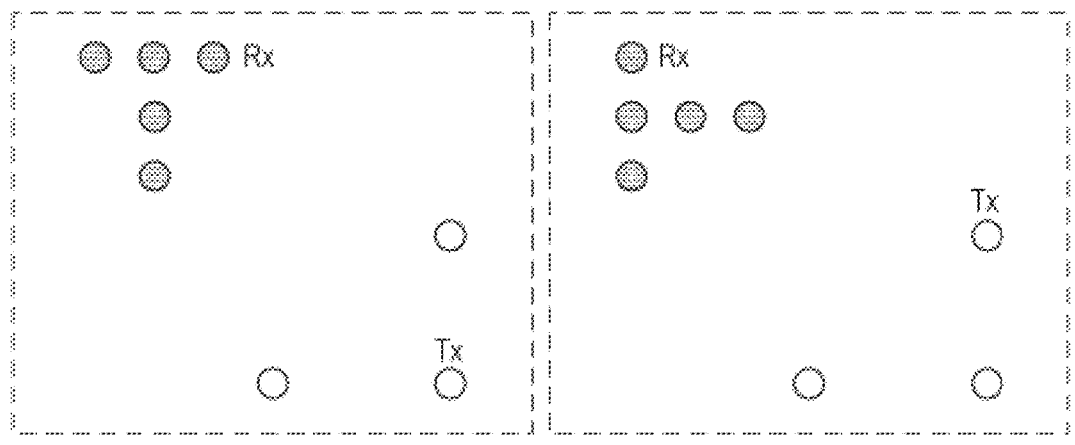

RADAR DEVICE

BACKGROUND

1. Technical Field

The present disclosure relates to a radar device.

2. Description of the Related Art

Recent studies have been made on a radar device using a radar transmission signal of a short wavelength including microwave or milliwave with which a high resolution is achieved. Development is required on a radar device (wide-angle radar device) that detects objects (targets) including a pedestrian as well as a vehicle in a wide-angle range in order to improve outdoor safety.

A known example of such a radar device is a pulse radar device that repeatedly emits pulsed waves. A wide-angle pulse radar that detects a vehicle and a pedestrian in a wide-angle range receives a mixture of multiple reflected waves from a target (for example, a vehicle) at a short distance and a target (for example, a pedestrian) at a long distance. This requires (1) a radar transmitter to have a configuration to transmit pulsed waves or pulse-modulated waves having a self correlation characteristic (hereinafter, referred to as a low range sidelobe characteristic) that achieves low range sidelobes, and (2) a radar receiver to have a configuration with a wide reception dynamic range.

Examples of the configuration of the wide-angle radar device include the following two configurations.

The first configuration transmits pulsed waves or modulated waves as radar waves by mechanical or electrical scanning using a directional beam of a narrow angle (beam width of a few degrees), and receives reflected waves using a narrow-angle directional beam. With this configuration, the scanning needs to be performed a large number of times to obtain a high resolution, which leads to a degradation in the performance of following a fast moving target.

The second configuration uses a method (direction of arrival (DOA) estimation) of receiving reflected waves through an array antenna including multiple antennas (antenna elements), and estimating the arrival angle of the reflected waves using a signal processing algorithm based on a reception phase difference corresponding to antenna spacing. This configuration allows the receiving side to estimate the arrival angle even when a frequency of scanning of a transmission beam on the transmitting side is reduced, thereby achieving a shortened scanning time and an improved following performance as compared to the first configuration. Examples of DOA estimation methods include a Fourier transform based on matrix calculation, a Capon method and a linear prediction (LP) method based on inverse matrix calculation, and a multiple signal classification (MUSIC) and an estimation of signal parameters via rotational invariance techniques (ESPRIT) based on eigenvalue calculation.

Disclosed is a radar device (also referred to as a MIMO radar) that includes multiple antennas (array antennas) on the transmitting side as well as the receiving side and performs beam scanning by signal processing using transmitting and receiving array antennas (see Jian Li, Stoica, Petre, "MIMO Radar with Colocated Antennas," Signal Processing Magazine, IEEE Vol. 24, Issue: 5, pp. 106-114, 2007, for example).

In the MIMO radar, a well-elaborated arrangement of antenna elements in transmitting and receiving array antennas may achieve the formation of virtual receiving array antennas (hereinafter, referred to as a virtual receiving array) whose number at maximum is equal to the product of the number of transmitting antenna elements and the number of receiving antenna elements. This arrangement results in an increased effective aperture length of the array antennas with a small number of elements.

The MIMO radar is applicable not only to one-dimensional scanning in the vertical direction or the horizontal direction but also to two-dimensional beam scanning in the vertical direction and the horizontal direction.

However, when the numbers of antennas on the transmitting and receiving sides are restricted to certain numbers (for example, four transmitting antennas and four receiving antennas) in order to achieve downsizing and low cost of the MIMO radar, a two-dimensional virtual receiving array of the MIMO radar is restricted in terms of aperture lengths in the vertical direction and the horizontal direction.

SUMMARY

One non-limiting and exemplary embodiment of the present disclosure provides a radar device that can achieve a maximally increased aperture length of a virtual receiving array.

In one general aspect of the present disclosure, the techniques disclosed here feature a radar device including: radar transmission circuitry which, in operation, transmits Nt radar signals through Nt transmitting antennas at each predetermined transmission period, where Nt is an integer of three or greater; and radar reception circuitry which, in operation, receives and performs Doppler frequency analysis processing on at least one reflected wave signal which is of the Nt radar signals transmitted and reflected by an object through Na receiving antennas, where Na is an integer of three or greater. The Nt transmitting antennas include Nt1 transmitting antennas arranged at a first spacing on a first straight line, and (Nt+1−Nt1) transmitting antennas arranged at a second spacing on a second straight line orthogonal to the first straight line, where Nt1 is an integer that satisfies Nt>Nt1. The integer Nt1 is a value that maximizes Nt1×(Nt+1−Nt1). The Na receiving antennas include Na1 receiving antennas arranged at a third spacing on the first straight line, and (Na+1−Na1) receiving antennas arranged at a fourth spacing on the second straight line, where Na1 is an integer that satisfies Na>Na1. The integer Na1 is a value that maximizes Na1×(Na+1−Na1).

One aspect of the present disclosure can achieve a maximally increased aperture length of a virtual receiving array.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 14A illustrates an exemplary arrangement of transmitting antennas and receiving antennas according to Variation 3 of Embodiment 1 of the present disclosure;

FIG. 14B illustrates an exemplary arrangement of transmitting antennas and receiving antennas according to Variation 3 of Embodiment 1 of the present disclosure;

FIG. 14C illustrates an exemplary arrangement of transmitting antennas and receiving antennas according to Variation 3 of Embodiment 1 of the present disclosure;

FIG. 14D illustrates an exemplary arrangement of transmitting antennas and receiving antennas according to Variation 3 of Embodiment 1 of the present disclosure;

DETAILED DESCRIPTION

[Underlying Knowledge Forming Basis of the Present Disclosure]

Figure 1A:
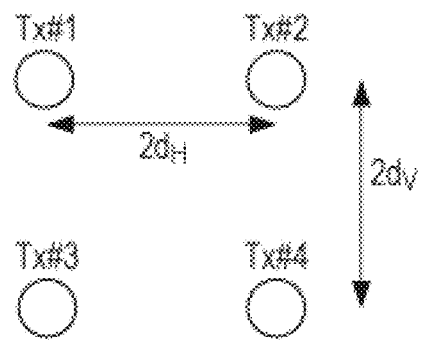
FIG. 1A illustrates an exemplary arrangement of a transmitting antenna.
Figure 1B:
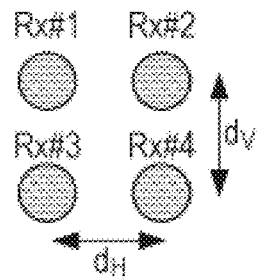
FIG. 1B illustrates an exemplary arrangement of a receiving antenna.

FIG. 1A illustrates an antenna arrangement of a transmitting array antenna including four transmitting antennas (Tx#1 to Tx#4), and FIG. 1B illustrates an antenna arrangement of a receiving array antenna including four receiving antennas (Rx#1 to Rx#4).

In FIG. 1A and FIG. 1B, $d_H$ represents an element spacing of the receiving antennas in the horizontal direction, and $d_V$ represents an element spacing of the receiving antennas in the vertical direction. In FIG. 1A, the transmitting antennas have element spacings of $2d_H$ and $2d_V$ in the horizontal direction and the vertical direction, respectively.

Figure 1C:
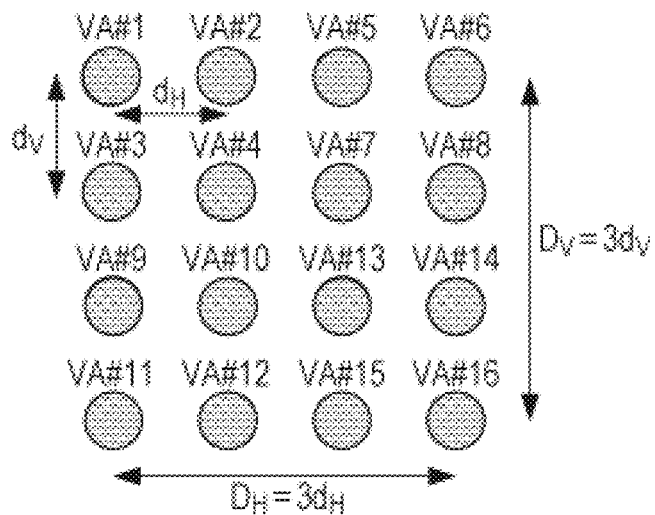
FIG. 1C illustrates an exemplary arrangement of a virtual receiving array.

FIG. 1C illustrates a virtual receiving array including the transmitting array antennas and the receiving array antennas in the antenna arrangements illustrated in FIGS. 1A and 1B.

As illustrated in FIG. 1C, the virtual receiving array includes 16 virtual receiving antennas (VA#1 to VA#16) two-dimensionally arranged with four antennas in the horizontal direction and four antennas in the vertical direction.

In FIG. 1C, the virtual receiving antennas have element spacings of $d_H$ and $d_V$ in the horizontal direction and the vertical direction, respectively. Thus, the virtual receiving array has aperture lengths $D_H$ and $D_V$ of $3d_H$ and $3d_V$ in the horizontal direction and the vertical direction, respectively.

For example, a beam width (Fourier beam width) BW of a Fourier beam with equally weighted amplitudes when the virtual receiving array having the aperture length $D=D_H=D_V$ for $d=d_H=d_V$ is used is given by an expression below. In this expression, $\lambda$ represents the wavelength of a radio signal (RF signal) transmitted from the transmitting side at a carrier frequency.

$$BW \cong 0.7\lambda/D\,[rad]$$

For the virtual receiving array (D=3d) illustrated in FIG. 1C, the Fourier beam width $BW \cong 0.7\lambda/3d$ [rad] is obtained.

For example, the Fourier beam width $BW \cong 0.7/1.5$ [rad] $\cong 30°$ is obtained for $d=0.5\lambda$, and the Fourier beam width $BW \cong 0.7/2.1$ [rad] $\cong 190$ is obtained for $d=0.7\lambda$.

A larger element spacing d narrows the Fourier beam width BW. However, a larger element spacing d results in generation of a grating lobe at an angle relatively close to that of a main beam, which leads to an increase in false detection.

Figure 2A:
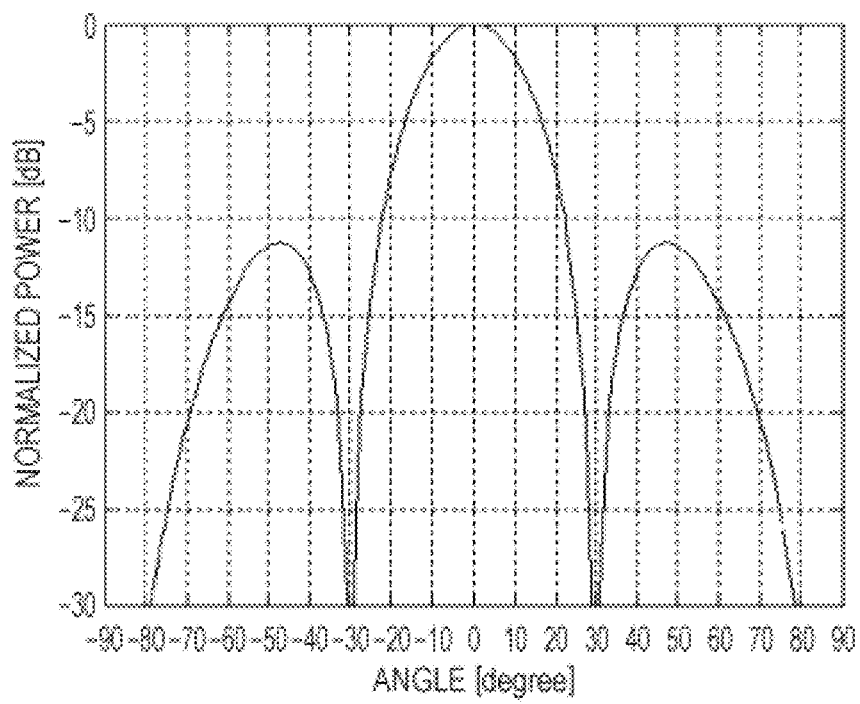
FIG. 2A illustrates a directivity pattern (d=0.5λ) provided by the virtual receiving array.
Figure 2B:
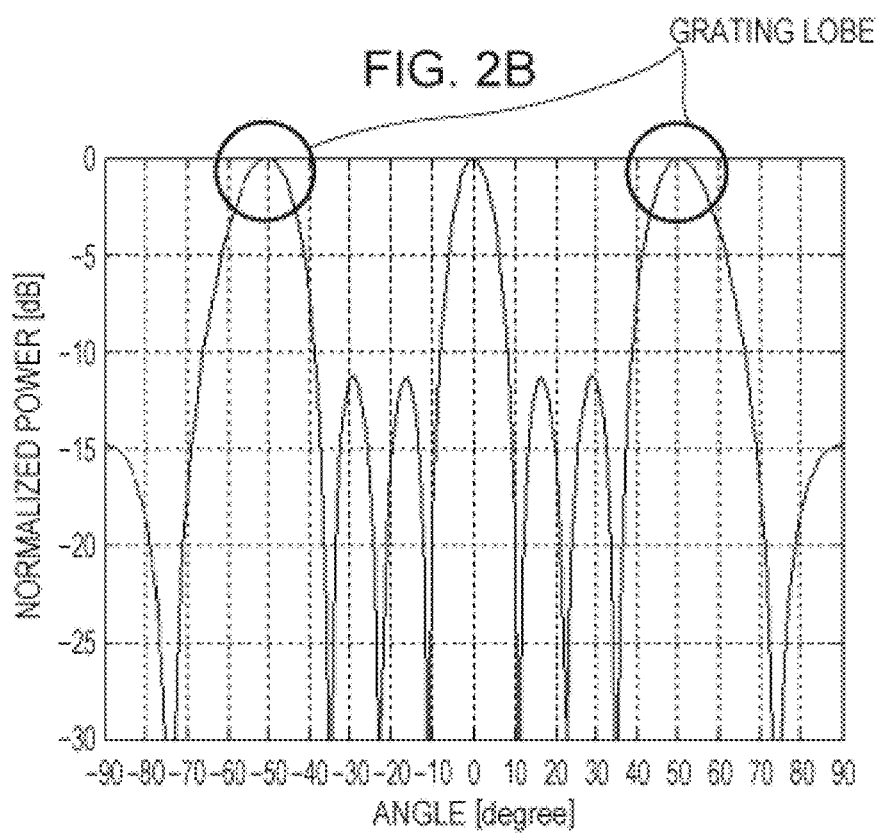
FIG. 2B illustrates a directivity pattern (d=1.3λ) provided by the virtual receiving array.

For example, FIG. 2A illustrates a directivity pattern with the element spacing $d=0.5\lambda$, and FIG. 2B illustrates a directivity pattern with the element spacing $d=1.3\lambda$. In FIGS. 2A and 2B, the main beam is formed in the direction of 0°.

As illustrated in FIG. 2A, the Fourier beam width BW of the main beam has a relatively large value of 30 approximately for the element spacing $d=0.5\lambda$. In FIG. 2A, no grating lobe is generated.

On the other hand, as illustrated in FIG. 2B, the Fourier beam width BW of the main beam has a relatively small value of 10° approximately for the element spacing $d=1.3\lambda$, but grating lobes are generated at angles apart from the main beam (direction of 0°) by ±50° approximately.

For example, in FIG. 2B, when a wide-angle radar has a detection angle larger than ±25 approximately, a grating lobe is generated in a detection angle range, causing an increase in false detection.

As described above, the increase of the element spacing d to narrow the Fourier beam width BW is restricted. The aperture length D can be increased by increasing the number of antenna elements instead of increasing the element spacing d, but the aperture length D of the virtual receiving array needs to be restricted to achieve downsizing and low cost.

A DOA estimation algorithm (for example, a MUSIC and a Capon method) that achieves a high resolution needs to be used to narrow the Fourier beam width BW (for example, BW=10° approximately) under these restrictions. However, in this case, an increased calculation amount is needed to perform an eigenvalue decomposition and an inverse matrix calculation.

In an aspect according to the present disclosure, the aperture lengths of the virtual receiving array in the vertical and horizontal directions are each increased to its maximum to perform two-dimensional beam scanning in the vertical and horizontal directions using a MIMO radar. Use of such a virtual receiving array enables improvement of an angle resolution with a smaller number of antennas, thereby achieving downsizing and cost reduction of a radar device.

Hereinafter, embodiments according to the aspect of the present disclosure are described in detail with reference to the accompanying drawings. An identical reference numeral is given to any identical component common to the embodiments, and description thereof is omitted to avoid duplication.

The following describes the configuration of the radar device in which the transmitting side sends out different transmission signals provided with code division multiplexing through multiple transmitting antennas, and then the receiving side separates the transmission signals to perform reception processing thereon. However, the radar device is not limited to this configuration, and may have a configuration in which the transmitting side sends out different transmission signals provided with frequency division multiplexing through multiple transmitting antennas, and then the receiving side separates the transmission signals to perform reception processing thereon. Alternatively, the radar device may have a configuration in which the transmitting side sends out transmission signals provided with time division multiplexing from multiple transmitting antennas, and then the receiving side performs reception processing thereon.

Embodiment 1

[Radar Device Configuration]

Figure 3:
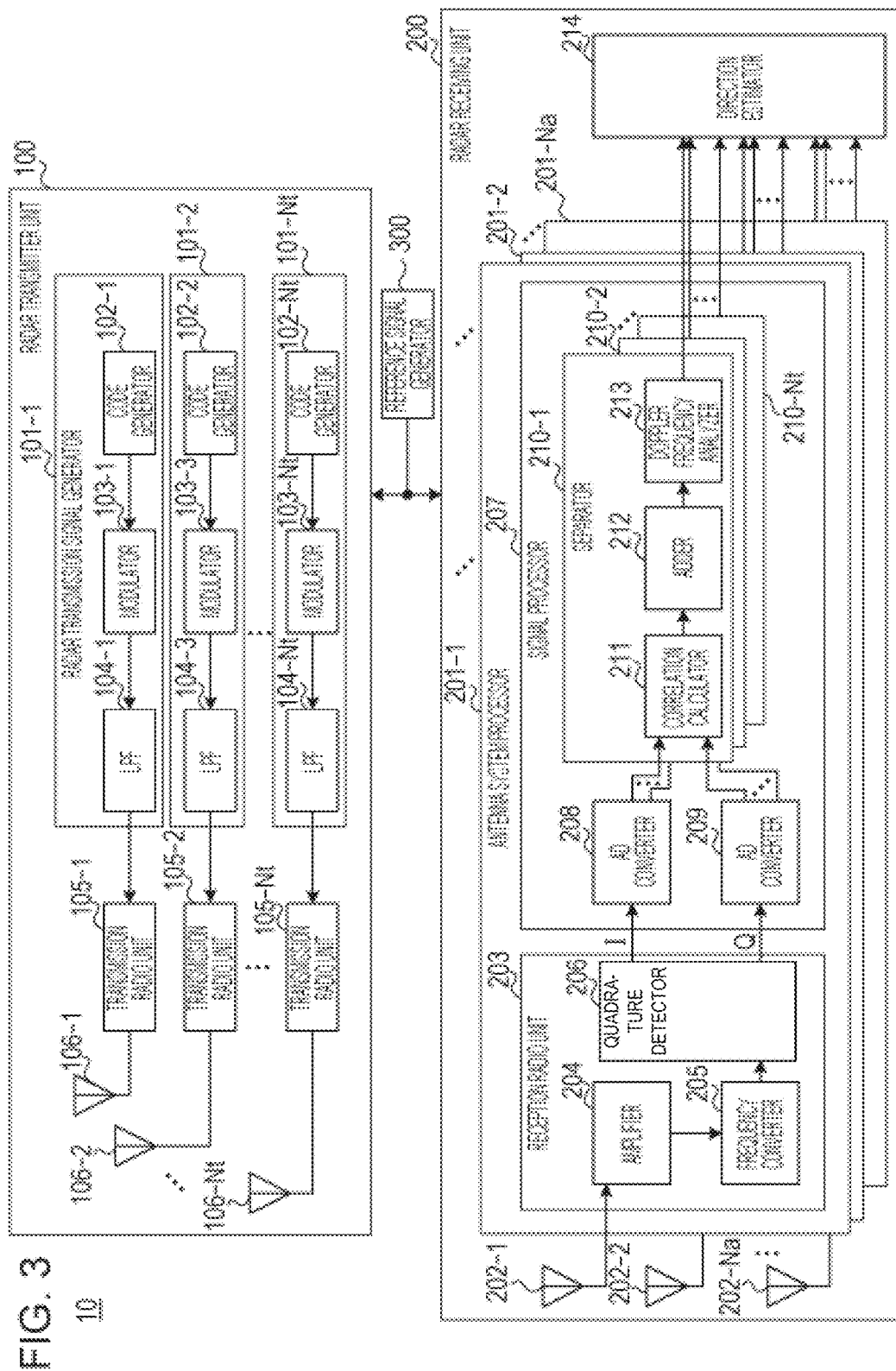
FIG. 3 is a block diagram of the configuration of a radar device according to Embodiment 1 of the present disclosure.

FIG. 3 is a block diagram of the configuration of a radar device 10 according to the present embodiment.

The radar device 10 includes a radar transmitter 100, a radar receiver 200, and a reference signal generator 300.

The radar transmitter 100 generates a radar signal (radar transmission signal) of a high frequency (radio frequency) based on a reference signal received from the reference signal generator 300. Then, the radar transmitter 100 transmits the radar transmission signal at a predetermined transmission period through a transmitting array antenna that includes multiple transmitting antennas 106-1 to 106-Nt.

The radar receiver 200 receives a reflected wave signal which is the radar transmission signal reflected by a target (not illustrated) through a receiving array antenna that includes multiple receiving antennas 202-1 to 202-Na. The radar receiver 200 processes the reflected wave signal received through the antennas 202 based on the reference signal received from the reference signal generator 300 so as to perform, for example, an existence detection and a direction estimation of the target. The target is an object to be detected by the radar device 10, and examples thereof include a vehicle and a person.

The reference signal generator 300 is connected to the radar transmitter 100 and the radar receiver 200. The reference signal generator 300 supplies the common reference signal to both of the radar transmitter 100 and the radar receiver 200 to synchronize processing of the radar transmitter 100 and the radar receiver 200.

[Configuration of Radar Transmitter 100]

The radar transmitter 100 includes radar transmission signal generators 101-1 to 101-Nt, transmission radio units 105-1 to 105-Nt, and the transmitting antennas 106-1 to 106-Nt. Thus, the radar transmitter 100 includes Nt transmitting antennas 106, and each transmitting antenna 106 is connected to the corresponding radar transmission signal generator 101 and the corresponding transmission radio unit 105.

The radar transmission signal generator 101 generates a timing clock obtained by multiplying the reference signal received from the reference signal generator 300 by a predetermined value, and generates the radar transmission signal based on the generated timing clock. Then, the radar transmission signal generator 101 repeatedly outputs the radar transmission signal at a predetermined radar transmission period (Tr). The radar transmission signal is expressed in $r_z(k, M) = I_z(k, M) + jQ_z(k, M)$. In this expression, z represents an index corresponding to each transmitting antenna 106, and is $z=1, \ldots, Nt$, and j represents the imaginary unit, k represents a discrete time, and M represents an ordinal number of the radar transmission period.

Each radar transmission signal generator 101 includes a code generator 102, a modulator 103, and a low pass filter (LPF) 104. The following describes components of the radar transmission signal generator 101-z corresponding to the z-th ($z=1, \ldots, Nt$) transmitting antenna 106.

Specifically, the code generator 102 generates codes $a(z)_n$ ($n=1, \ldots, L$) (pulse codes) in a code sequence of a code length L at each radar transmission period Tr. Codes having low correlation or no correlation therebetween are used as the codes $a(z)_n$ ($z=1, \ldots, Nt$) generated by each of the code generators 102-1 to 102-Nt. Examples of the code sequence include a Walsh-Hadamard code, an M-sequence code, and a Gold code.

The modulator 103 provides the codes $a(z)_n$ received from the code generator 102 with a pulse modulation (amplitude modulation, amplitude shift keying (ASK), and pulse shift keying) or a phase modulation (phase shift keying), and outputs a modulated signal to the LPF 104.

The LPF 104 outputs a signal component of the modulated signal received from the modulator 103, which is not higher than a predetermined threshold band, as a baseband radar transmission signal to the transmission radio unit 105.

The z-th ($z=1, \ldots, Nt$) transmission radio unit 105 performs a frequency conversion on the baseband radar transmission signal output from the z-th radar transmission signal generator 101, generates a radar transmission signal in a carrier frequency (radio frequency or RF) band, amplifies this radar transmission signal through a transmission amplifier to have a predetermined transmission electric power P [dB], and outputs the amplified radar transmission signal to the z-th transmitting antenna 106.

The z-th ($z=1, \ldots, Nt$) transmitting antenna 106 emits the radar transmission signal output from the z-th transmission radio unit 105 into space.

Figure 4:
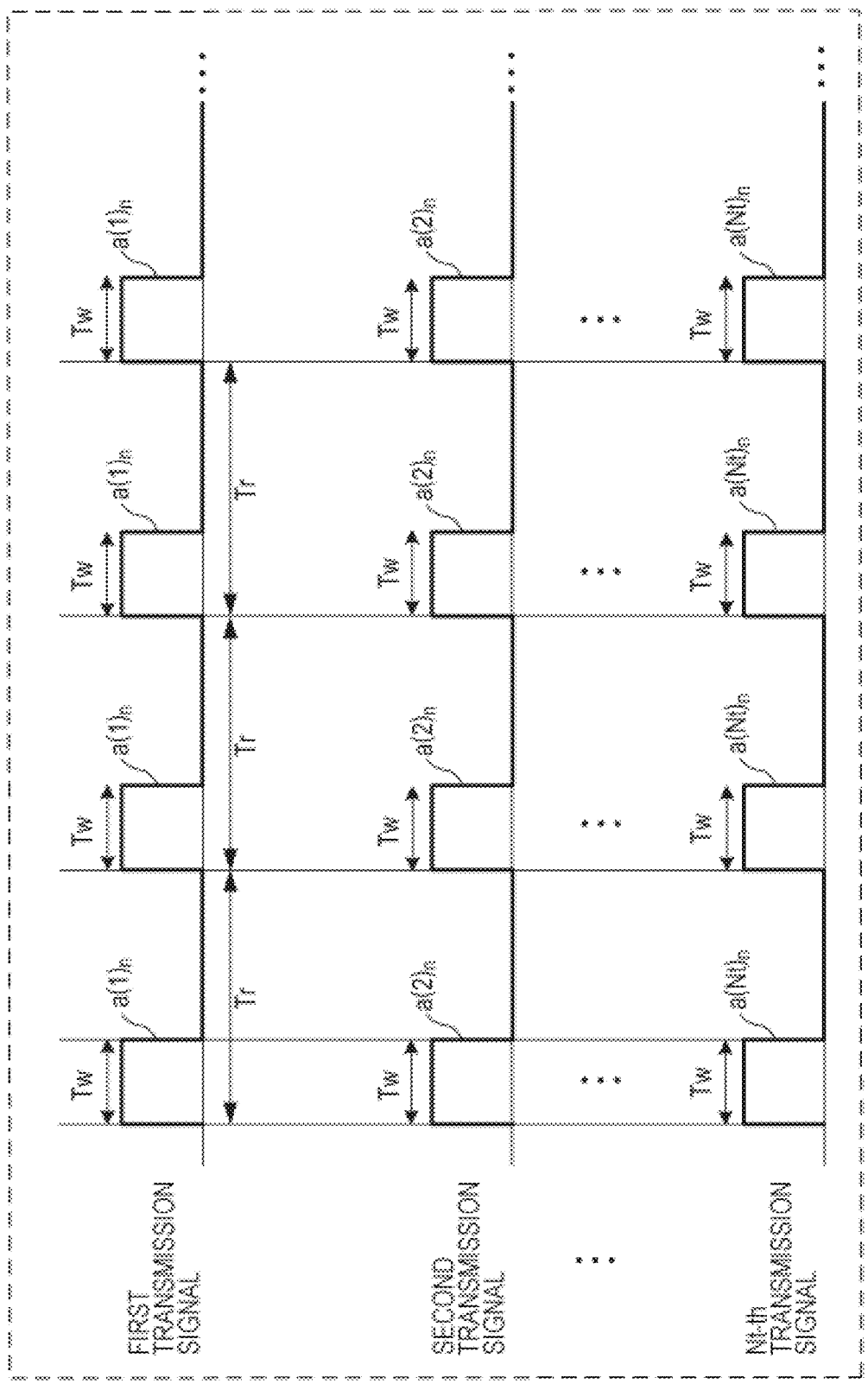
FIG. 4 illustrates an exemplary radar transmission signal according to Embodiment 1 of the present disclosure.

FIG. 4 illustrates the radar transmission signal transmitted from the Nt transmitting antennas 106 of the radar transmitter 100. A code transmission slot Tw includes a pulse code sequence of the code length L. In each radar transmission period Tr, the pulse code sequence is transmitted in the code transmission slot Tw, and no signal is transmitted in the remaining slot (Tr−Tw). A pulse modulation using No samples is performed per one pulse code ($a(z)_n$), and thus Nr (=No×L) sample signals are included in each code transmission slot Tw. In other words, the modulator 103 employs a sampling rate of (No×L)/Tw. The slot (Tr−Tw) with no signal includes Nu samples.

Figure 5:
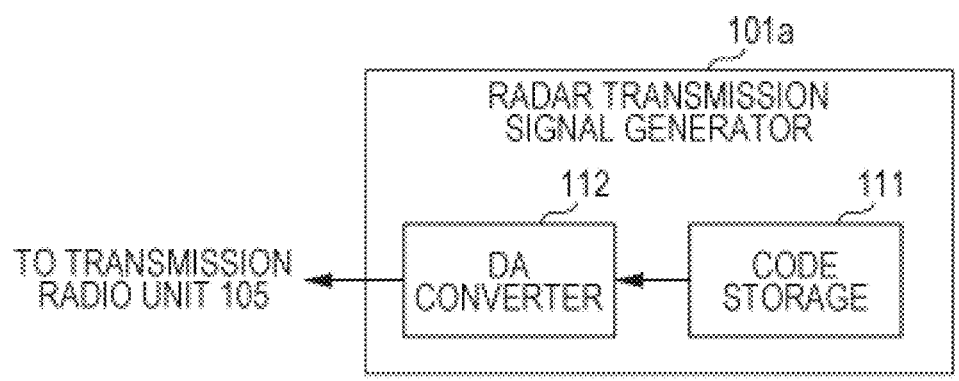
FIG. 5 is a block diagram of another configuration of a radar transmission signal generator according to Embodiment 1 of the present disclosure.

The radar transmitter 100 includes, in place of the radar transmission signal generator 101, a radar transmission signal generator 101a illustrated in FIG. 5. The radar transmission signal generator 101a does not include the code generator 102, the modulator 103, or the LPF 104, which are illustrated in FIG. 3, but includes a code storage 111 and a DA converter 112 instead. The code storage 111 previously stores a code sequence generated by the code generator 102 (FIG. 3), and cyclically and sequentially reads out the stored code sequence. The DA converter 112 converts a code sequence (digital signal) output from the code storage 111 into an analog signal.

[Configuration of Radar Receiver 200]

In FIG. 3, the radar receiver 200 includes Na receiving antennas 202, constituting an array antenna. The radar receiver 200 also includes Na antenna system processors 201-1 to 201-Na and a direction estimator 214.

Each receiving antenna 202 receives the reflected wave signal which is the radar transmission signal reflected by the target (object), and outputs the reflected wave signal thus received as a reception signal to the corresponding antenna system processor 201.

Each antenna system processor 201 includes a reception radio unit 203 and a signal processor 207.

The reception radio unit 203 includes an amplifier 204, a frequency converter 205, and an quadrature detector 206. The reception radio unit 203 generates a timing clock obtained by multiplying the reference signal received from the reference signal generator 300 by a predetermined value, and operates based on this generated timing clock. Specifically, the amplifier 204 amplifies the reception signal received from the receiving antenna 202 to a predetermined level, and the frequency converter 205 performs a frequency conversion of a high frequency band (radio frequency band) of the reception signal into a baseband. Then, the quadrature detector 206 converts this reception signal in the baseband into a reception signal in a baseband including an I signal and a Q signal.

The signal processor 207 includes AD converters 208 and 209 and separators 210-1 to 210-Nt.

The AD converter 208 receives the I signal from the quadrature detector 206, and the AD converter 209 receives the Q signal from the quadrature detector 206. The AD converter 208 performs discrete time sampling on a baseband signal including the I signal so as to convert the I signal into digital data. The AD converter 209 performs discrete time sampling on a baseband signal including the Q signal so as to convert the Q signal into digital data.

The samplings performed by the AD converters 208 and 209 include Ns discrete samplings in a duration Tp (=Tw/L) of one sub pulse in the radar transmission signal. In other words, Ns oversamplings are performed per one sub pulse.

The following description uses an I signal $I_r(k, M)$ and a Q signal $Q_r(k, M)$ to express a baseband reception signal as the output from the AD converters 208 and 209 at the discrete time k in the M-th radar transmission period Tr[M], as a complex signal $x(k, M) = I_r(k, M) + jQ_r(k, M)$. In the following, the discrete time k is defined with reference to a timing (k=1) at which the radar transmission period (Tr) starts, and the signal processor 207 periodically operates until k=(Nr+Nu)Ns/No, which is a last sample point before the radar transmission period Tr ends. Namely, the discrete time k has a value of k=1, . . . , (Nr+Nu)Ns/No, where j is the imaginary unit.

The signal processor 207 includes the Nt separators 210 whose number is equal to the number of systems as the number of the transmitting antennas 106. Each separator 210 includes a correlation calculator 211, an adder 212, and a Doppler frequency analyzer 213. The configuration of the z-th (z=1, . . . , Nt) separator 210 is described below.

The correlation calculator 211 calculates a correlation between the discrete sample value x(k, M) and the pulse codes $a(z)_n$ (where z=1, . . . , Nt, and n=1, . . . , L) of the code length L transmitted through the radar transmitter 100. The discrete sample value x(k, M) includes the discrete sample values $I_r(k, M)$ and $Q_r(k, M)$ received from the AD converters 208 and 209 at each radar transmission period Tr. For example, the correlation calculator 211 calculates a sliding correlation between the discrete sample value x(k, M) and the pulse codes $a(z)_n$. For example, a correlation calculated value $AC_{(z)}(k, M)$ for the sliding correlation at the discrete time k in the M-th radar transmission period Tr[M] is calculated based on an expression below.

$$AC_{(z)}(k, M) = \sum_{n=1}^{L} x(k + N_s(n-1), M) a(z)_n^*  \qquad (1)$$

In the above expression, an asterisk (*) represents a complex conjugate operator.

The correlation calculator 211 calculates the correlation over a duration of k=1, . . . , (Nr+Nu)Ns/No in accordance with, for example, Expression (1).

Figure 6:
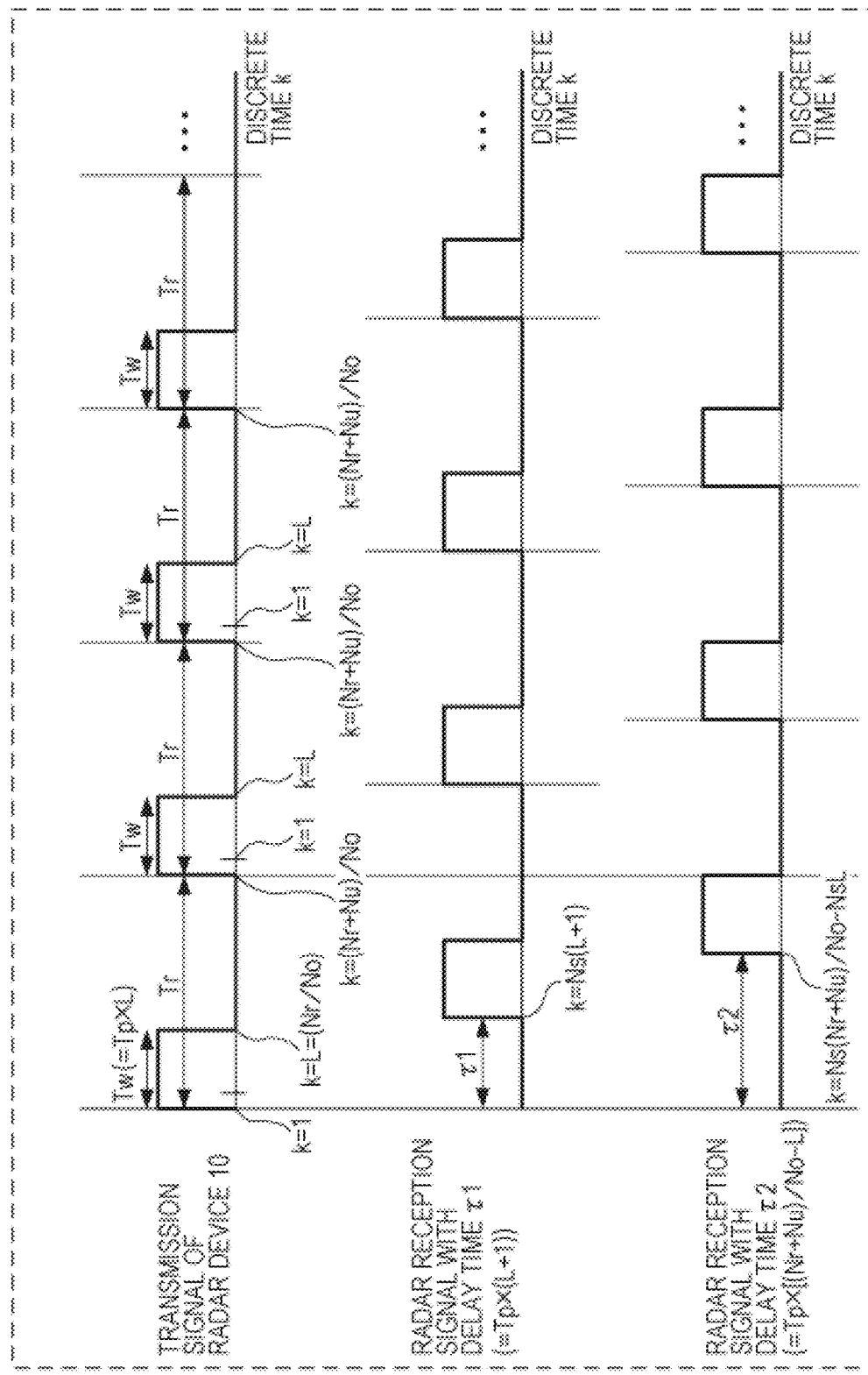
FIG. 6 illustrates an example of a transmission timing and a measurement range of the radar transmission signal according to Embodiment 1 of the present disclosure.

The correlation calculator 211 is not limited to the correlation calculation for k=1, . . . , (Nr+Nu)Ns/No, and may limit a measurement range (that is, the range of k) depending on the range of existence of the target as a measurement target of the radar device 10. This allows the radar device 10 to achieve a reduction in the calculation amount of the correlation calculator 211. For example, the correlation calculator 211 may limit the measurement range to k=Ns(L+1), . . . , (Nr+Nu)Ns/No−NsL. In this case, as illustrated in FIG. 6, the radar device 10 does not perform measurement in the time slot corresponding to the code transmission slot Tw.

Thus, in the radar device 10, the correlation calculator 211 does not perform processing in a duration (at least a duration less than τ1) in which the radar transmission signal going directly into the radar receiver 200, which achieves a measurement free from the influence of this phenomenon. When the measurement range (range of k) of the correlation calculation is limited, the measurement range (range of k) of processing at the adder 212, the Doppler frequency analyzer 213, and the direction estimator 214 to be described later may be limited as well. This achieves a reduced processing amount at each component and thus a reduced electric power consumption at the radar receiver 200.

At each discrete time k in the M-th radar transmission period Tr, the adder 212 performs an addition (coherent integration) of the correlation calculated value $AC_{(z)}(k, M)$ received from the correlation calculator 211 over a duration (Tr×Np) that is a predetermined number (Np) of the radar transmission periods Tr. This addition (coherent integration) processing involving the number Np of additions over the duration (Tr×Np) is performed by an expression below.

$$CI_{(z)}(k, m) = \sum_{g=1}^{N_P} AC_{(z)}(k, N_P(m-1) + g) \qquad (2)$$

In this expression, $CI_{(z)}(k, m)$ represents the sum (hereinafter, also referred to as the correlation sum) of the correlation calculated values, where Np is an integer equal to or larger than one, and m is an integer equal to or larger than one as an ordinal number of the number of additions in units of the number Np of additions at the adder 212. The value z is z=1, . . . , Nt.

The adder 212 performs Np additions in units of the output from the correlation calculator 211 obtained per the radar transmission period Tr. Specifically, the adder 212 calculates the correlation value $CI_{(z)}(k, m)$ as the sum of the correlation calculated values $AC_{(z)}(k, Np(m-1)+1)$ to $AC_{(z)}(k, Np\times m)$ for each discrete time k. Thus, the adder 212 can achieve an improved SNR of the reflected wave signal through the Np additions of the correlation calculated value in a range in which the reflected wave signals from the target have a high correlation. This then achieves an improved measurement performance related to estimation of an arrival distance of the target.

In order to obtain an ideal addition gain, a condition for having a phase component of each correlation calculated value within a certain range needs to be satisfied in an addition time period for the number Np of additions of the correlation calculated value. Thus, the number Np of additions is preferably set based on an expected maximum moving speed of the target as a measurement target. This is because a larger expected maximum speed of the target results in a larger amount of change of a Doppler frequency included in a reflected wave from the target, and thus a shorter time duration in which a high correlation is obtained. In this case, the number Np of additions is small, which leads to a small gain improvement effect of the addition by the adder 212.

The Doppler frequency analyzer 213 performs the coherent integration for the same discrete time k in units of $CI_{(z)}(k, N_c(w-1)+1)$ to $CI_{(z)}(k, N_c \times w)$ as Nc outputs obtained at each discrete time k from the adder 212. For example, the Doppler frequency analyzer 213 corrects a phase variation $\Phi(fs)=2\pi fs(Tr \times Np)\Delta\Phi$ in accordance with 2Nf different Doppler frequencies $fs\Delta\Phi$ as expressed in an expression below, and then performs the coherent integration.

$$FT\_CI_{(z)}^{Nant}(k, f_s, w) = \sum_{q=0}^{N_c-1} CI_{(z)}(k, N_c(w-1)+q+1)\exp[-j\phi(f_s)q] \quad (3)$$

$$= \sum_{q=0}^{N_c-1} CI_{(z)}(k, N_c(w-1)+q+1)$$

$$\exp[-j2\pi f_s T_r N_p q \Delta\phi]$$

In this expression, $FT\_CI_{(z)}^{Nant}(k, fs, w)$ represents the w-th output of the Doppler frequency analyzer 213, and represents a result of the coherent integration of the Doppler frequency $fs\Delta\Phi$ by the Nant-th antenna system processor 201 at the discrete time k. Also in the expression, Nant=1 to Na, fs=−Nf+1, . . . , 0, . . . , Nf, k=1, . . . , (Nr+Nu)Ns/No, w is an integer equal to or larger than one, and $\Delta\Phi$ represents a phase rotation unit.

Accordingly, each antenna system processor 201 obtains $FT\_CI_{(z)}^{Nant}(k, -Nf+1, w), \ldots, FT\_CI_{(z)}^{Nant}(k, Nf-1, w)$ as the result of the coherent integration in accordance with 2Nf Doppler frequency components at the discrete time k, for each duration (Tr×Np×Nc) of a plurality, Np×Nc, of the radar transmission periods Tr. In the expression, j is the imaginary unit, and the value z is z=1, . . . , Nt.

For $\Delta\Phi=1/Nc$, the above-described processing of the Doppler frequency analyzer 213 is equivalent to discrete Fourier transform (DFT) processing of the outputs from the adder 212 with a sampling interval Tm=(Tr×Np) and a sampling frequency fm=1/Tm.

Setting Nf to a power of two allows application of fast Fourier transform (FFT) processing at the Doppler frequency analyzer 213, thereby achieving a large reduction in the calculation amount. For Nf>Nc, the FFT processing can also be applied in a region in which q>Nc holds by performing zero filling processing that sets $CI_{(z)}(k, N_c(w-1)+q)=0$, and thus the calculation amount can be largely reduced accordingly.

The Doppler frequency analyzer 213 may perform, in place of the FFT processing, processing of sequentially calculating the product sum calculation expressed in Expression (3) above. Specifically, the Doppler frequency analyzer 213 may generate a coefficient $\exp[-j2\pi f_s T_r N_p q\Delta\Phi]$ for fs=−Nf+1, . . . , 0, . . . , Nf−1 for $CI_{(z)}(k, N_c(w-1)+q+1)$ as the Nc outputs obtained from the adder 212 at each discrete time k, and sequentially perform the product sum calculation processing. Here, q=0 to Nc−1.

In the following, a virtual receiving array correlation vector h(k, fs, w) in expressions below represents a set of the w-th outputs $FT\_CI(z)^1(k, fs, w), FT\_CI_{(z)}^2(k, fs, w), \ldots, FT\_CI_{(z)}^{Na}(k, fs, w)$ obtained through the same processing on the Na respective antenna system processors 201. The virtual receiving array correlation vector h(k, fs, w) includes Nt×Na elements as the product of the number of transmitting antennas, Nt, and the number of receiving antennas, Na. The virtual receiving array correlation vector h(k, fs, w) is used to later describe the processing of performing a direction estimation of the reflected wave signal from the target based on a phase difference between the receiving antennas 202. Here, z=1, . . . , Nt, and b=1, . . . , Na.

$$h(k, fs, w) = \begin{bmatrix} FT\_CI_{(1)}^1(k, fs, w) \\ FT\_CI_{(2)}^1(k, fs, w) \\ \vdots \\ FT\_CI_{(Nt)}^1(k, fs, w) \\ FT\_CI_{(1)}^2(k, fs, w) \\ FT\_CI_{(2)}^2(k, fs, w) \\ \vdots \\ FT\_CI_{(Nt)}^2(k, fs, w) \\ \vdots \\ FT\_CI_{(1)}^{Na}(k, fs, w) \\ FT\_CI_{(2)}^{Na}(k, fs, w) \\ \vdots \\ FT\_CI_{(Nt)}^{Na}(k, fs, w) \end{bmatrix} = \begin{bmatrix} h^1(k, fs, w) \\ h^2(k, fs, w) \\ \vdots \\ h^{Na}(k, fs, w) \end{bmatrix} \quad (4)$$

$$h^b(k, fs, w) = \begin{bmatrix} FT\_CI_{(1)}^b(k, fs, w) \\ FT\_CI_{(2)}^b(k, fs, w) \\ \vdots \\ FT\_CI_{(Nt)}^b(k, fs, w) \end{bmatrix} \quad (5)$$

In the above, the processing at each component of the signal processor 207 has been described.

The direction estimator 214 calculates, for the virtual receiving array correlation vector h(k, fs, w) of the w-th Doppler frequency analyzer 213 output from the antenna system processors 201-1 to 201-Na, a virtual receiving array correlation vector $h\_{after\_cal}(k, fs, w)$ obtained by correcting a phase deviation and an amplitude deviation between the antenna system processors 201 using an array correction value $h\_cal_{[y]}$. The virtual receiving array correlation vector $h\_{after\_cal}(k, fs, w)$ is given by an expression below. Here, y=1, . . . , (Nt×Na). $h\_{after\_cal}(k, fs, w)=CA\ h(k, fs, w)$ $$CA = \begin{bmatrix} h\_cal_{[1]} & 0 & \cdots & 0 \\ 0 & h\_cal_{[2]} & \ddots & \cdots \\ \vdots & \ddots & \ddots & 0 \\ 0 & \cdots & 0 & h\_cal_{[Nt \times Na]} \end{bmatrix} \quad (6)$$

Then, using the virtual receiving array correlation vector $h\_{after\_cal}(k, fs, w)$, the direction estimator 214 performs direction estimation processing of the horizontal direction and the vertical direction based on a phase difference of the reflected wave signals between the receiving antennas 202. The direction estimator 214 calculates a space profile by treating an azimuth direction θ and an elevation direction Φ in a direction estimation evaluating function value P (θ, φ, k, fs, w) as variables in a predetermined angle range, extracts a predetermined number of local maximum peaks of the calculated space profile in descending order, and sets the azimuth and elevation directions of each local maximum peak as arrival direction estimation values.

Different kinds of the evaluating function value $P(\theta, \varphi, k, fs, w)$ are provided by different arrival direction estimation algorithms. For example, an estimation method using an array antenna disclosed in Cadzow, J. A., "Direction-of-arrival estimation using signal subspace modeling," Aerospace and Electronic Systems, IEEE Transactions on Volume: 28, Issue: 1, pp. 64-79, Publication Year: 1992.

For example, a beamformer method can be expressed in an expression below. Alternatively, the Capon and MUSIC methods are applicable as well.

$$P(\theta_u, \varphi_v, k, fs, w) = |a(\theta_u, \varphi_v)^H h\_after\_cal(k, fs, w)|^2 \qquad (7)$$

In this expression, a superscript H is the Hermite transposition operator, and $a(\theta_u, \varphi_v)$ represents the directional vector of the virtual receiving array for arrival wave in an azimuth direction $\theta_u$ and an elevation direction $\varphi_v$.

As described above, the direction estimator 214 outputs the w-th calculated arrival direction estimation value, the discrete time k, the Doppler frequency $fs\Delta\Phi$, and the angle $\theta_u$, as a radar positioning result.

The directional vector $a(\theta_u, \varphi_v)$ is a (Nt×Na) column vector including an element as a complex response of the virtual receiving array when a reflected wave of the radar transmission signal arrives in the azimuth direction $\theta_u$ and the elevation direction $\varphi_v$. The complex response $a(\theta_u, \varphi_v)$ of the virtual receiving array represents a phase difference geometric-optically calculated depending on an element spacing between antennas.

$\theta_u$ takes values separated by a predetermined azimuth spacing $\beta_1$ in an azimuth range in which the arrival direction estimation is to be performed. For example, $\theta_u$ is set as described below.

$\theta_u = \theta\text{min} + u\beta_1$ where $u=0, \ldots, NU$ $NU = \text{floor}[(\theta\text{max} - \theta\text{min})/\beta_1] + 1$ In this expression, floor(x) is a function that returns a largest integer value not larger than a real number x.

$\varphi_v$ takes values separated by a predetermined elevation spacing $\beta_2$ in an elevation angle range in which the arrival direction estimation is to be performed. For example, $\varphi_v$ is set as described below.

$\varphi_v = \varphi\text{min} + v\beta_2$ where $v=0, \ldots, NV$ $NV = \text{floor}[(\varphi\text{max} - \varphi\text{min})/\beta_2] + 1$ The present embodiment assumes that the directional vector of the virtual receiving array is previously calculated based on a virtual receiving array arrangement VA#1, ..., VA#(Nt×Na) described later. Each element of the directional vector of the virtual receiving array indicates a phase difference geometric-optically calculated at the element spacing between antennas in the order of the virtual receiving array arrangement VA#1, ..., VA#(Nt×Na) to be described later.

The time information k described above may be converted into distance information for outputting. An expression below may be used to convert the time information k into distance information R(k). Here, Tw represents the code transmission slot, L represents the pulse code length, and $C_0$ represents the speed of light.

$$R(k) = k\frac{T_w C_0}{2L} \qquad (8)$$

The Doppler frequency information ($fs\Delta\Phi$) may be converted into a relative speed component for outputting. An expression below may be used to convert the Doppler frequency $fs\Delta\Phi$ into a relative speed component $vd(fs)$. Here, $\lambda$ represents the wavelength of the RF signal output from the transmission radio unit 105 at a carrier frequency.

$$v_d(f_s) = \frac{\lambda}{2} f_s \Delta\theta \qquad (9)$$

[Antenna Arrangement in Radar Device 10]

Description will be made of an arrangement of the Nt transmitting antennas 106 and the Na receiving antennas 202 in the radar device 10 having the configuration described above.

Figure 7A:
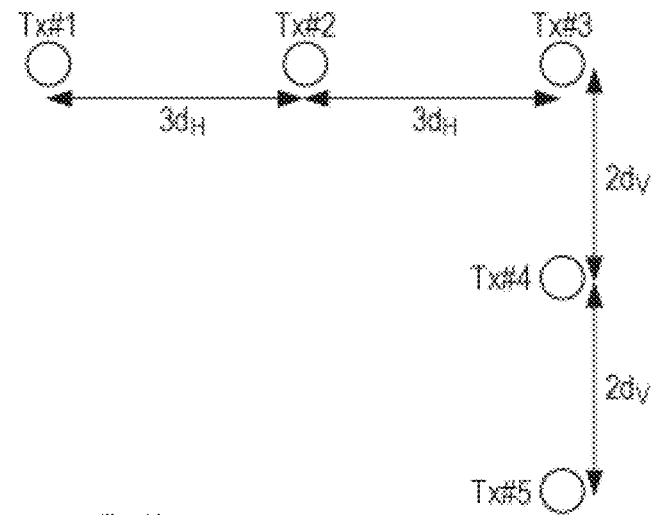
FIG. 7A illustrates an exemplary arrangement of transmitting antennas according to Embodiment 1 of the present disclosure.
Figure 7B:
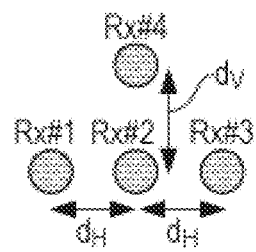
FIG. 7B illustrates an exemplary arrangement of receiving antennas according to Embodiment 1 of the present disclosure.
Figure 7C:
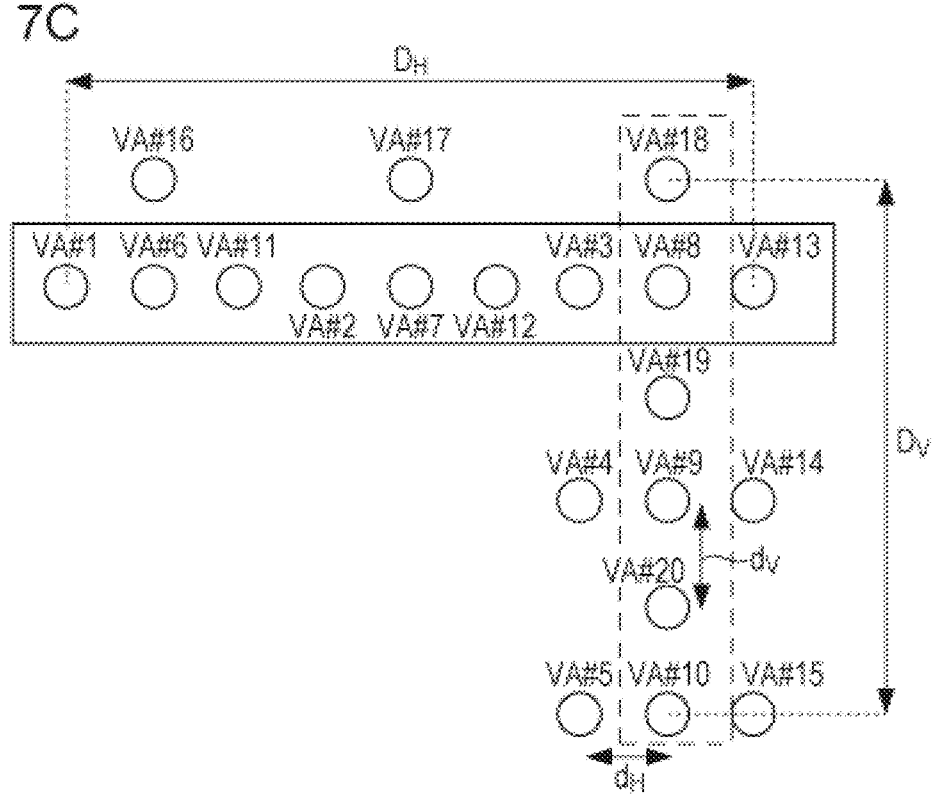
FIG. 7C illustrates an exemplary arrangement of the virtual receiving array according to Embodiment 1 of the present disclosure.

FIG. 7A illustrates an exemplary arrangement of the transmitting antennas 106, and FIG. 7B illustrates an exemplary arrangement of the receiving antennas 202. FIG. 7C illustrates an arrangement of the virtual receiving array obtained with the antenna arrangements illustrated in FIGS. 7A and 7B.

In this example, the number Nt of the transmitting antennas 106 is five, and the number Na of the receiving antennas 202 is four. Tx#1 to Tx#5 represent five transmitting antennas 106, and Rx#1 to Rx#4 represent four receiving antennas 202.

In FIGS. 7A to 7C, $d_H$ represents an element spacing of the receiving antennas 202 in the horizontal direction, and $d_V$ represents an element spacing of the receiving antennas 202 in the vertical direction. In FIG. 7A, the transmitting antennas 106 have element spacings of $3d_H$ and $2d_V$ in the horizontal direction and the vertical direction, respectively.

In FIG. 7A, the transmitting antennas Tx#1 to Tx#5 are arranged in a 180°-rotated L shape, and in FIG. 7B, the receiving antennas Rx#1 to Rx#4 are arranged in a 180°-rotated T shape.

The antenna arrangements in FIGS. 7A and 7B provide the arrangement of the virtual receiving array in FIG. 7C having the following characteristics.

(1) The horizontal positional relation between the three receiving antennas Rx#1, Rx#2, and Rx#3 arranged at the element spacing $d_H$ in the horizontal direction, and the three transmitting antennas Tx#1, Tx#2, and Tx#3 arranged at the element spacing $3d_H$ in the horizontal direction provides the virtual receiving array including nine virtual receiving antennas linearly arranged at the element spacing $d_H$ in the horizontal direction (VA#1, VA#6, VA#11, VA#2, VA#7, VA#12, VA#3, VA#8, and VA#13 enclosed by a straight line illustrated in FIG. 7C).

(2) The vertical positional relation between the two receiving antennas Rx#2 and Rx#4 arranged at the element spacing $d_V$ in the vertical direction, and the three transmitting antennas Tx#3, Tx#4, and Tx#5 arranged at the element spacing $2d_V$ in the vertical direction provides the virtual receiving array including six virtual receiving antennas linearly arranged at the element spacing $d_V$ in the vertical direction (VA#18, VA#8, VA#19, VA#9, VA#20, and VA#10 enclosed by a dashed line illustrated in FIG. 7C).

Specifically, in the Nt transmitting antennas 106 and the Na the receiving antennas 202, antenna elements are arranged such that the number of linearly arranged antenna elements is maximized in each of the horizontal direction and the vertical direction.

In other words, the Nt transmitting antennas 106 and the Na receiving antennas 202 are arranged so as to maximize the product (corresponding to the area of an opening surface of the virtual receiving array) of the maximum number of antennas linearly arranged at a predetermined spacing ($3d_H$ or $d_H$) in the horizontal direction, and the maximum number of antennas linearly arranged at a predetermined spacing ($2d_V$ or $d_V$) in the vertical direction.

For example, in five transmitting antennas 106, the number of linearly arranged antenna elements is maximized in both of the horizontal and vertical directions when three antenna elements are linearly arranged in each of the horizontal and vertical directions (L shape in FIG. 7A).

In other words, Nt (Nt=5 in FIG. 7A) transmitting antennas 106 include Nt1 (an integer that satisfies Nt>Nt1; Nt1=3 in FIG. 7A) transmitting antennas 106 linearly arranged at a first spacing (the spacing $3d_H$ in FIG. 7A), and (Nt+1−Nt1) (three in FIG. 7A) transmitting antennas 106 linearly arranged at a second spacing (the spacing $2d_V$ in FIG. 7A) in a direction (the vertical direction in FIG. 7A) orthogonal to the Nt1 transmitting antennas 106. Here, Nt1 is a value that maximizes Nt1×(Nt+1−Nt1).

Similarly, for example, in four receiving antennas 202, the number of linearly arranged antenna elements is maximized in both of the horizontal and vertical directions when three antenna elements are linearly arranged in one of the horizontal and vertical directions, and two antenna elements are linearly arranged in the other (T shape of three in the horizontal direction and two in the vertical direction in FIG. 7B).

Na (Na=4 in FIG. 7B) receiving antennas 202 include Na1 (Na1 is an integer that satisfies Na>Na1; Na1=3 in FIG. 7B) receiving antennas 202 linearly arranged at a third spacing (the spacing $d_H$ in FIG. 7B), and (Na+1−Na1) (two in FIG. 7B) receiving antennas 202 linearly arranged at a fourth spacing (the spacing $d_V$ in FIG. 7B) in a direction orthogonal to the Na1 receiving antennas 202. Here, Na1 is a value that maximizes Na1×(Na+1−Na1).

Accordingly, the aperture lengths $D_H$ and $D_V$ of the virtual receiving array illustrated in FIG. 7C in the horizontal and vertical directions are $8d_H$ and $5d_V$, respectively.

As described above, the virtual receiving array can have an arrangement that maximizes the number of virtual receiving antennas VA (the number of elements of a linear array) linearly arranged in accordance with the relation between the transmitting antennas 106 and the receiving antennas 202 in the horizontal direction, and the number of virtual receiving antennas (VA) (the number of elements of a linear array) linearly arranged in accordance with the relation between the transmitting antennas 106 and the receiving antennas 202 in the vertical direction. This achieves a maximized opening surface that includes the aperture length $D_H$ ($8d_H$ in FIG. 7C) of the virtual receiving array in the horizontal direction and the aperture length $D_V$ ($5d_V$ in FIG. 7C) thereof in the vertical direction.

Next follows a description of a case in which a beam width $BW_H=10°$ is achieved by Fourier beam scanning with equally weighted amplitudes in the virtual receiving array illustrated in FIG. 7C.

For example, a beam width (Fourier beam width) BW by a Fourier beam with equally weighted amplitudes is almost equal to 0.7λ/D [rad] when the virtual receiving array having the aperture length D is used. In other words, the aperture length D needs to be 4λ as expressed in Expression (10) to obtain the beam width $BW_H=10°(=10π/180$ [rad]).

$$BW_H \cong 0.7\lambda/D = 10\pi/180 \therefore D = 4\lambda \quad (10)$$

Thus, as expressed in Expression (11), the aperture length $D_H$ in the horizontal direction is the element spacing $d_H=0.5\lambda$, which satisfies $8d_H=4\lambda$. As expressed in Expression (12), the aperture length $D_V$ in the vertical direction is the element spacing $d_V=0.8\lambda$, which satisfies $5d_V=4\lambda$.

$$d_H = 4\lambda/(9-1) = 0.5\lambda \quad (11)$$

$$d_V = 4\lambda/(6-1) = 0.8\lambda \quad (12)$$

As expressed in Expressions (11) and (12), the element spacing $d_H$ in the horizontal direction and the element spacing $d_V$ in the vertical direction can be set to be smaller than the wavelength λ. Thus, grating lobes are generated at angle directions (±75 approximately) relatively far from the main beam, outside a detection angle of a wide-angle radar, thereby preventing an increase in false detection.

Figure 8A:
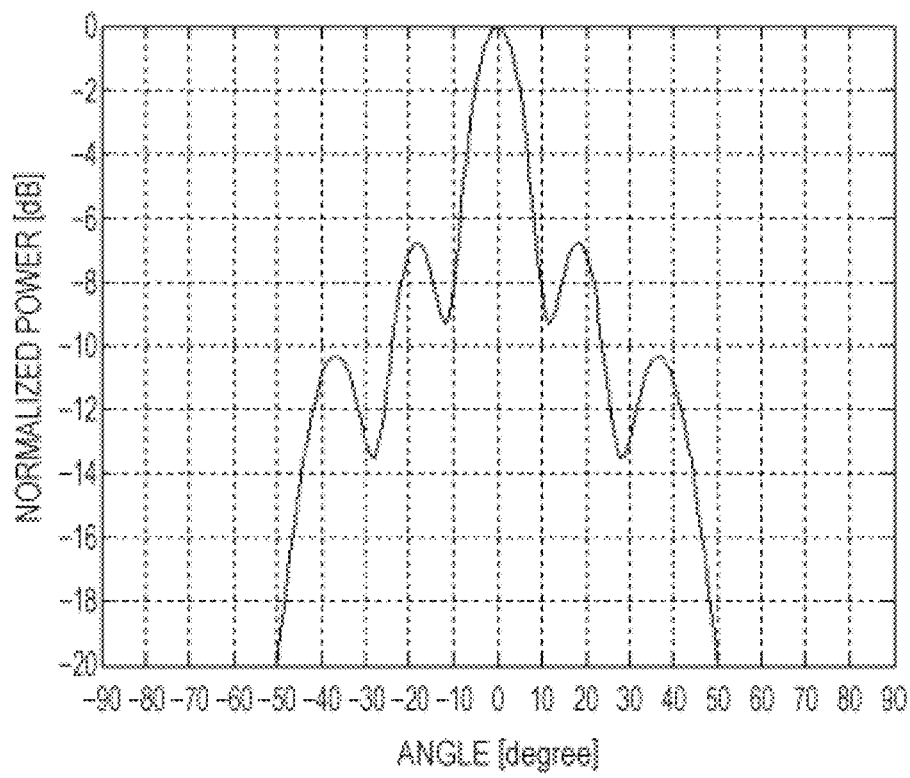
FIG. 8A illustrates a directivity pattern in the horizontal direction provided by the virtual receiving array according to Embodiment 1 of the present disclosure.
Figure 8B:
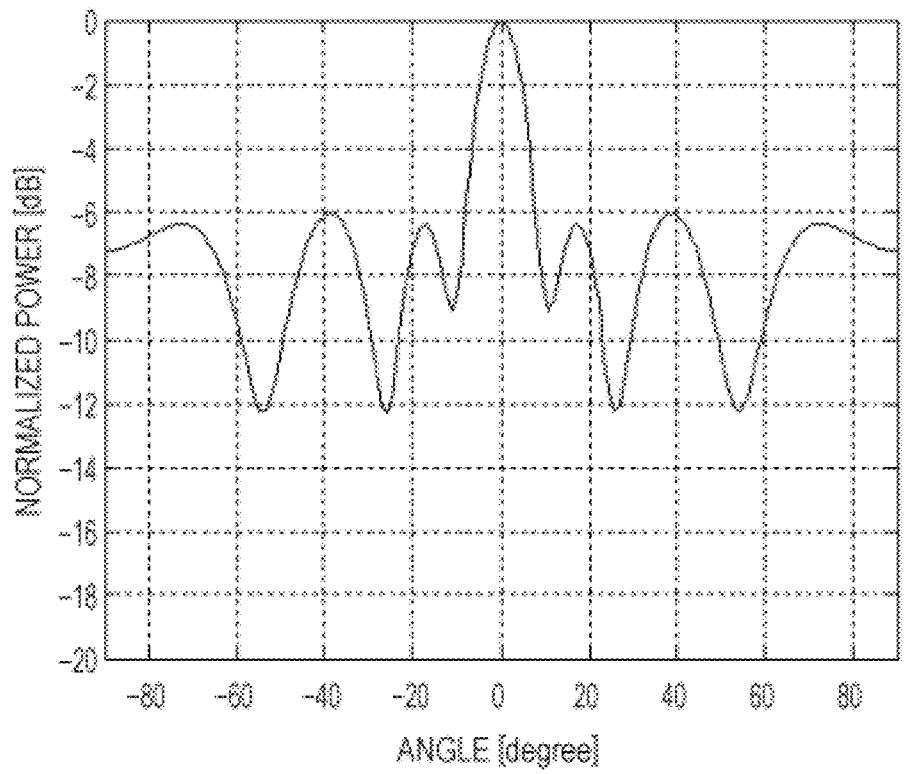
FIG. 8B illustrates a directivity pattern in the vertical direction provided by the virtual receiving array according to Embodiment 1 of the present disclosure.

FIG. 8A illustrates a directivity pattern in the horizontal direction when the element spacing $d_H$ in the horizontal direction is 0.5λ, and FIG. 8B illustrates a directivity pattern in the vertical direction when the element spacing $d_V$ in the vertical direction is 0.8λ. In FIGS. 8A and 8B, the main beam is assumed to be formed in the direction of 0°.

As illustrated in FIGS. 8A and 8B, in both of the horizontal and vertical directions, the Fourier beam width BW of the main beam has a relatively narrow value of 10° approximately and no grating lobes are generated.

As described above, the use of the array arrangements illustrated in FIGS. 7A and 7B in a relatively small number of antenna elements of five transmitting antennas and four receiving antennas can maximize the opening surface that includes the horizontal and vertical directions of the virtual receiving array.

Thus, according to the present embodiment, the aperture length of the virtual receiving array can be maximally increased in the vertical and horizontal directions when two-dimensional beam scanning in the vertical and horizontal directions is performed by using a MIMO radar.

In addition, when the element spacings ($d_H$ and $d_V$) of the receiving antenna 202 in both of the horizontal and vertical directions is set not to be larger than 1λ, a high resolution with the Fourier beam width BW=10° approximately can be achieved by the Fourier beam scanning with equally weighted amplitudes. In other words, a high resolution can be achieved in the horizontal and vertical directions with a small calculation amount without application of the arrival direction estimation algorithm that can achieve a high resolution.

As described above, according to the present embodiment, the use of such a virtual receiving array can achieve an improved angle resolution with a smaller number of antennas, and thus downsizing and cost reduction of the radar device 10.

In the virtual receiving array illustrated in FIG. 7C, the number of linearly arrayed antennas is nine in the horizontal direction and six in the vertical direction. Meanwhile, in an example expressed in Expressions (11) and (12), the element spacing $d_H$ in the horizontal direction is 0.5λ, and the element spacing $d_V$ in the vertical direction is 0.8λ.

Thus, the element spacing $d_V$ in the vertical direction is set to be larger than the element spacing $d_V$ in the horizontal direction when the number of linearly arrayed antennas of the virtual receiving array in the vertical direction, which is the product (six in FIGS. 7A and 7B) of the maximum number of the transmitting antennas 106 linearly arranged in the vertical direction (three in FIG. 7A) and the maximum number of the receiving antennas 202 linearly arranged in the vertical direction (two in FIG. 7B), is smaller than the number of linearly arrayed antennas of the virtual receiving array in the horizontal direction, which is the product (nine in FIGS. 7A and 7B) of the maximum number of the transmitting antennas 106 linearly arranged in the horizontal direction (three in FIG. 7A) and the maximum number of the receiving antennas 202 linearly arranged in the horizontal direction (three in FIG. 7B).

Setting the element spacing $d_V$ in the vertical direction to be larger than the element spacing $d_H$ in the horizontal direction reduces (to zero in FIG. 7C) a difference between the aperture length $D_H$ (=4λ) in the horizontal direction and the aperture length $D_V$ (=4λ) in the vertical direction, thereby absorbing a difference between angle resolutions in the vertical and horizontal directions.

In FIG. 7A and FIG. 7B, the distance between the transmitting antennas Tx#1 to Tx#5 and the receiving antennas Rx#1 to Rx#4 does not affect the arrangement of the virtual receiving array. However, when arranged closer to each other, a transmitting antenna and a receiving antenna have a higher degree of coupling therebetween, and thus are more preferably arranged further away from each other in an allowable antenna size. This is the same for other antenna arrangements described later.

FIGS. 7A and 7B illustrate an exemplary antenna arrangement of five transmitting antennas and four receiving antennas. However, when receiving antennas are arranged in the transmitting antenna arrangement illustrated in FIG. 7A and transmitting antennas are arranged in the receiving antenna arrangement illustrated in FIG. 7B, the same configuration as the arrangement of the virtual receiving array illustrated in FIG. 7C is obtained, thereby achieving the same effect. This is the same for other antenna arrangements described later.

(Variation 1)

Figure 9A:
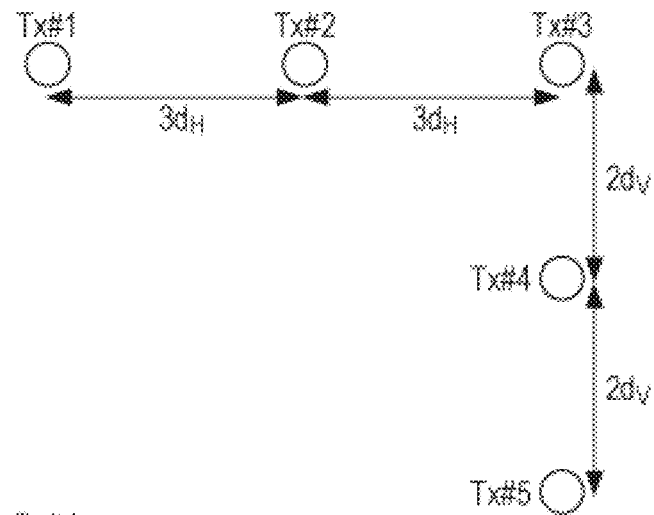
FIG. 9A illustrates an exemplary arrangement of transmitting antennas according to Variation 1 of Embodiment 1 of the present disclosure.
Figure 9B:
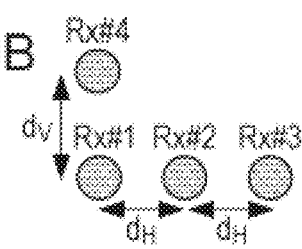
FIG. 9B illustrates an exemplary arrangement of receiving antennas according to Variation 1 of Embodiment 1 of the present disclosure.

The antenna arrangement of five transmitting antennas and four receiving antennas is not limited to the antenna arrangement illustrated in FIGS. 7A and 7B, and may be, for example, an antenna arrangement illustrated in FIGS. 9A and 9B.

In FIG. 9A, like in FIG. 7A, the transmitting antennas Tx#1 to Tx#5 are arranged in a 180°-rotated L shape. In FIG. 9B, the receiving antennas Rx#1 to Rx#4 are arranged in an L shape.

Figure 9C:
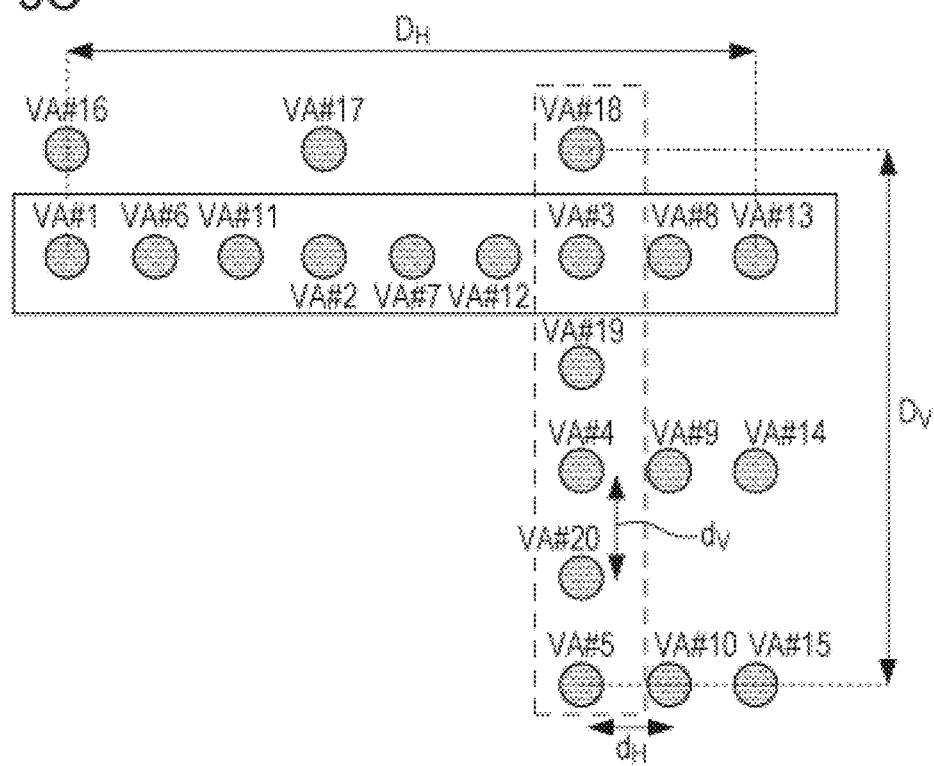
FIG. 9C illustrates an exemplary arrangement of a virtual receiving array according to Variation 1 of Embodiment 1 of the present disclosure.

The antenna arrangement illustrated in FIGS. 9A and 9B provides the arrangement of the virtual receiving array illustrated in FIG. 9C having the following characteristics.

(1) The horizontal positional relation between three receiving antennas Rx#1, Rx#2, and Rx#3 arranged at the element spacing $d_H$ in the horizontal direction and three transmitting antennas Tx#1, Tx#2, and Tx#3 arranged at the element spacing $3d_H$ in the horizontal direction provides the virtual receiving array including nine virtual receiving antennas linearly arranged at the element spacing $d_H$ in the horizontal direction (VA#1, VA#6, VA#11, VA#2, VA#7, VA#12, VA#3, VA#8, and VA#13 enclosed by a straight line illustrated in FIG. 9C).

(2) The vertical positional relation between two receiving antennas Rx#1 and Rx#4 arranged at the element spacing $d_V$ in the vertical direction and three transmitting antennas Tx#3, Tx#4, and Tx#5 arranged at the element spacing $2d_V$ in the vertical direction provides the virtual receiving array including six virtual receiving antennas linearly arranged at the element spacing $d_V$ in the vertical direction (VA#18, VA#3, VA#19, VA#4, VA#20, and VA#5 enclosed by a dashed line illustrated in FIG. 9C).

In this manner, in FIG. 9A similarly to FIG. 7A, in five transmitting antennas 106, the number of linearly arranged antenna elements is maximized in both of the horizontal and vertical directions when three antenna elements are linearly arranged in each of the horizontal and vertical directions (L shape in FIG. 9A).

In FIG. 9B, in four receiving antennas 202, the number of linearly arranged antenna elements is maximized in both of the horizontal and vertical directions when, three antenna elements are linearly arranged in one of the horizontal and vertical directions, and two antenna elements are linearly arranged in the other (L shape of three in the horizontal direction and two in the vertical direction in FIG. 9B).

In this manner, the virtual receiving array can have an arrangement in which the number of linearly arrayed virtual receiving antennas is maximized in the horizontal direction and the vertical direction. This achieves a maximized opening surface that includes the aperture length $D_H$ ($8d_H$ in FIG. 7C) of the virtual receiving array in the horizontal direction and the aperture length $D_V$ ($5d_V$ in FIG. 7C) thereof in the vertical direction.

(Variation 2)

The antenna arrangement of five transmitting antennas 106 and four receiving antennas 202 is not limited to the antenna arrangements illustrated in FIGS. 7A, 7B, 9A, and 9B.

For example, as illustrated in FIGS. 10A to 10H, any combination of the following arrangements may be adopted: the transmitting antennas 106 may be arranged in an L shape (FIGS. 10A and 10E), a T shape (FIGS. 10B and 10F), a lateral T shape (FIGS. 10C and 10G), or a cross shape (FIGS. 10D and 10H); and the receiving antennas 202 may be arranged in a T shape (FIGS. 10A to 10D) or an L shape (FIGS. 10E to 10H).

The antenna arrangements illustrated in FIGS. 10A to 10H provide the virtual receiving array having an arrangement in which the number of linearly arrayed virtual receiving antennas is maximized in the horizontal direction and the vertical direction. This achieves a maximized opening surface that includes the aperture length $D_H$ ($8d_H$) of the virtual receiving array in the horizontal direction and the aperture length $D_V$ ($5d_V$) thereof in the vertical direction.

The antenna arrangements illustrated in FIGS. 10A to 10H may be vertically inverted arrangements of the L-shaped and T-shaped arrangements and a laterally inverted arrangement of the lateral T-shaped arrangement (not illustrated).

Figure 10A:
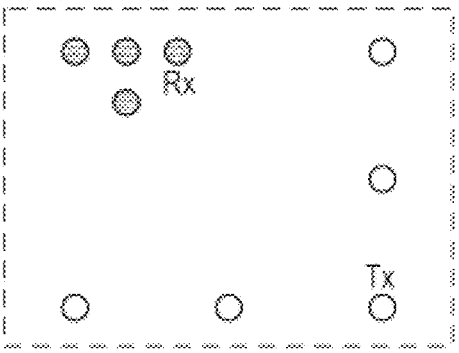
FIG. 10A illustrates an exemplary arrangement of transmitting antennas and receiving antennas according to Variation 2 of Embodiment 1 of the present disclosure.
Figure 10B:
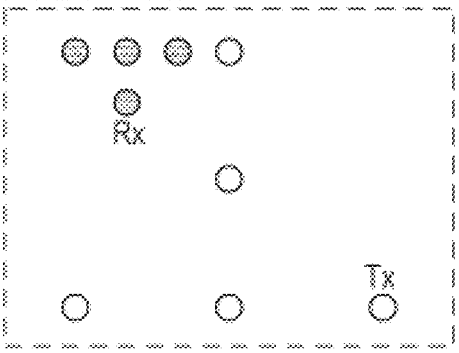
FIG. 10B illustrates an exemplary arrangement of transmitting antennas and receiving antennas according to Variation 2 of Embodiment 1 of the present disclosure.
Figure 10C:
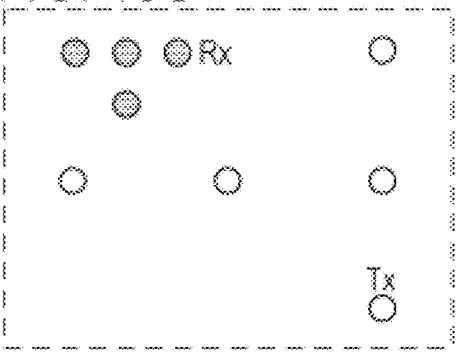
FIG. 10C illustrates an exemplary arrangement of transmitting antennas and receiving antennas according to Variation 2 of Embodiment 1 of the present disclosure.
Figure 10D:
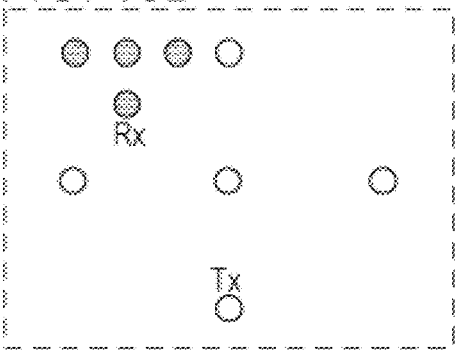
FIG. 10D illustrates an exemplary arrangement of transmitting antennas and receiving antennas according to Variation 2 of Embodiment 1 of the present disclosure.
Figure 10E:
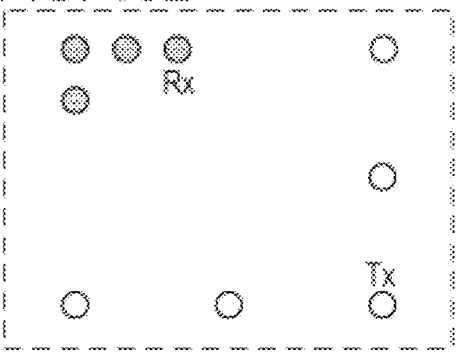
FIG. 10E illustrates an exemplary arrangement of transmitting antennas and receiving antennas according to Variation 2 of Embodiment 1 of the present disclosure.
Figure 10F:
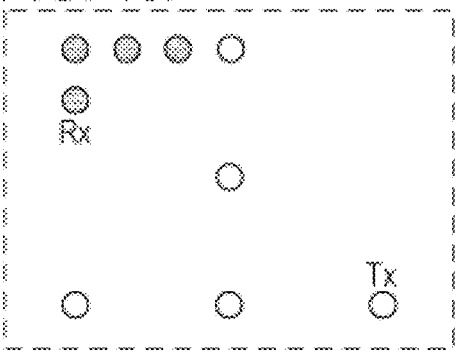
FIG. 10F illustrates an exemplary arrangement of transmitting antennas and receiving antennas according to Variation 2 of Embodiment 1 of the present disclosure.
Figure 10G:
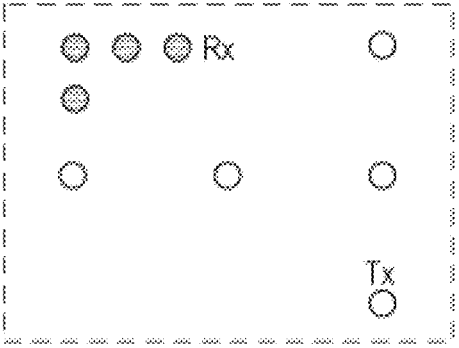
FIG. 10G illustrates an exemplary arrangement of transmitting antennas and receiving antennas according to Variation 2 of Embodiment 1 of the present disclosure.
Figure 10H:
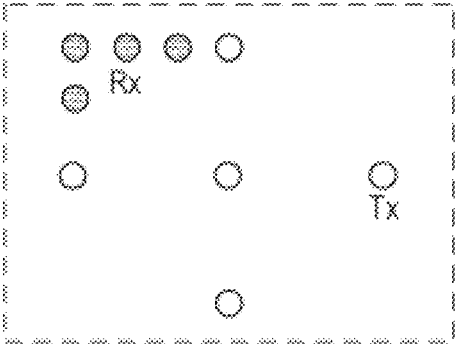
FIG. 10H illustrates an exemplary arrangement of transmitting antennas and receiving antennas according to Variation 2 of Embodiment 1 of the present disclosure.
Figure 11A:
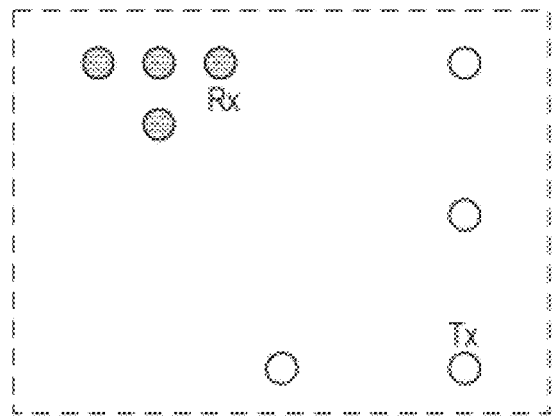
FIG. 11A illustrates an exemplary arrangement of transmitting antennas and receiving antennas according to Variation 3 of Embodiment 1 of the present disclosure.
Figure 11B:
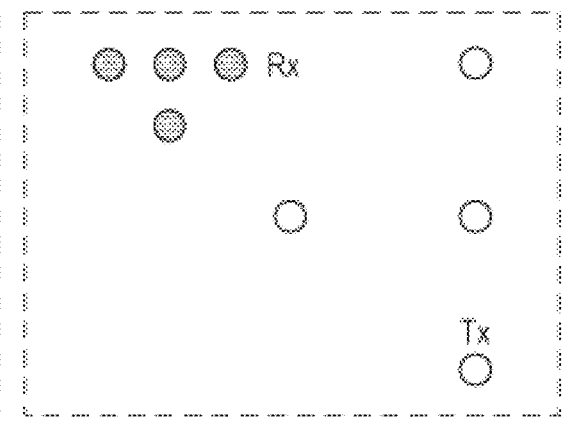
FIG. 11B illustrates an exemplary arrangement of transmitting antennas and receiving antennas according to Variation 3 of Embodiment 1 of the present disclosure.
Figure 11C:
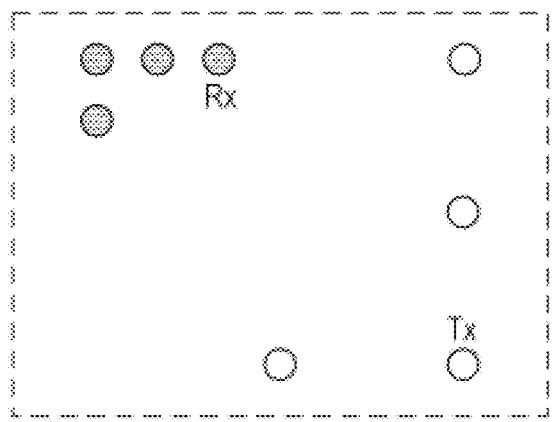
FIG. 11C illustrates an exemplary arrangement of transmitting antennas and receiving antennas according to Variation 3 of Embodiment 1 of the present disclosure.
Figure 11D:
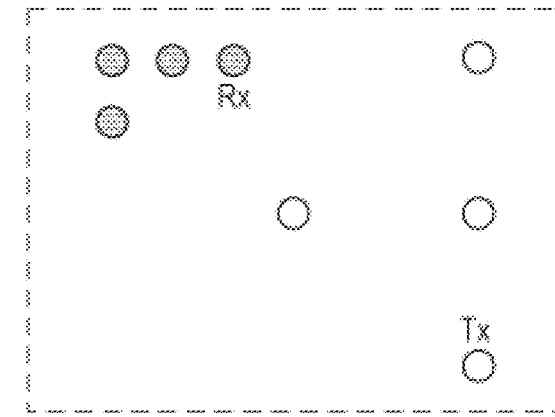
FIG. 11D illustrates an exemplary arrangement of transmitting antennas and receiving antennas according to Variation 3 of Embodiment 1 of the present disclosure.

For example, when there is a restriction on the area of the transmitting and receiving antennas for downsizing of the radar device 10, a more preferable arrangement is an L-shaped arrangement (as illustrated in FIGS. 10A and 10E, for example) of the transmitting antennas 106 in which a higher degree of separation is obtained between the transmitting antennas 106 and between the receiving antennas 202.

(Variation 3)

The number Nt of the transmitting antennas 106 may be a value other than five, and the number Na of the receiving antennas 202 may be a value other than four.

As an example, FIGS. 11A to 11D illustrate antenna arrangements of four transmitting antennas 106 and four receiving antennas 202. The transmitting antennas 106 are arranged in an L shape, a T shape, or a lateral T shape, and the receiving antennas 202 are arranged in a T shape or an L shape.

Figure 12A:
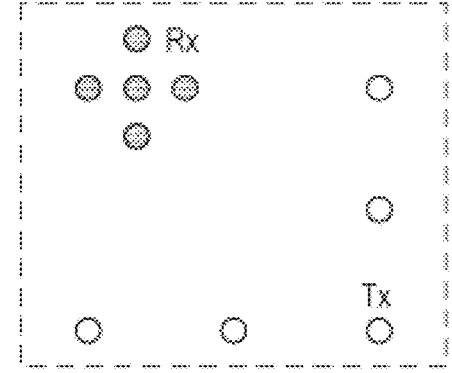
FIG. 12A illustrates an exemplary arrangement of transmitting antennas and receiving antennas according to Variation 3 of Embodiment 1 of the present disclosure.
Figure 12B:
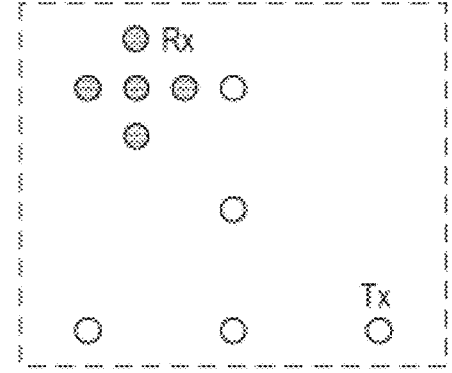
FIG. 12B illustrates an exemplary arrangement of transmitting antennas and receiving antennas according to Variation 3 of Embodiment 1 of the present disclosure.
Figure 12C:
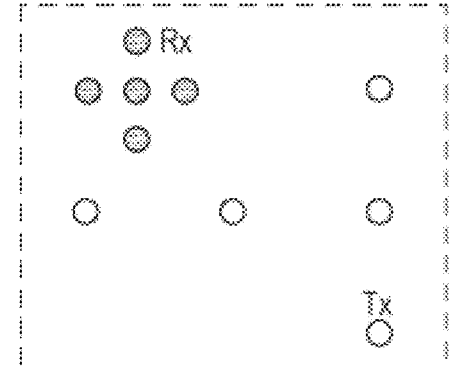
FIG. 12C illustrates an exemplary arrangement of transmitting antennas and receiving antennas according to Variation 3 of Embodiment 1 of the present disclosure.
Figure 12D:
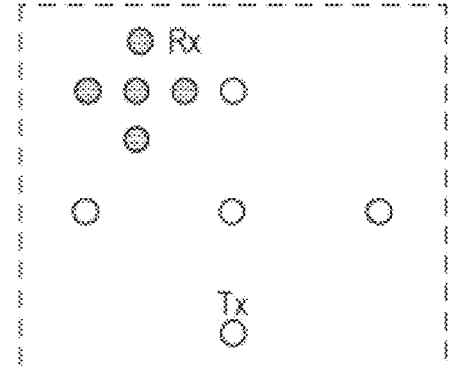
FIG. 12D illustrates an exemplary arrangement of transmitting antennas and receiving antennas according to Variation 3 of Embodiment 1 of the present disclosure.
Figure 12E:
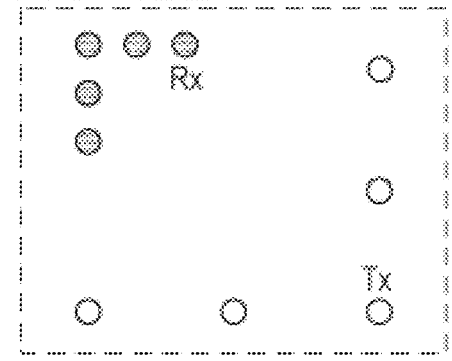
FIG. 12E illustrates an exemplary arrangement of transmitting antennas and receiving antennas according to Variation 3 of Embodiment 1 of the present disclosure.
Figure 12F:
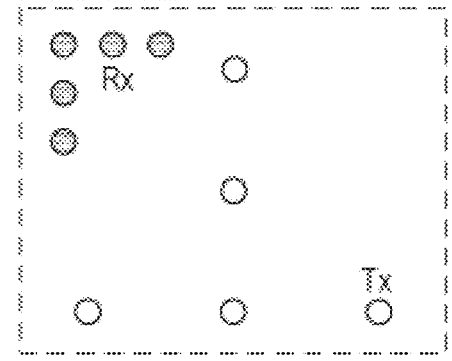
FIG. 12F illustrates an exemplary arrangement of transmitting antennas and receiving antennas according to Variation 3 of Embodiment 1 of the present disclosure.
Figure 12G:
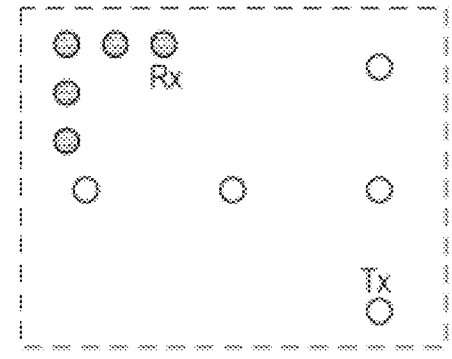
FIG. 12G illustrates an exemplary arrangement of transmitting antennas and receiving antennas according to Variation 3 of Embodiment 1 of the present disclosure.
Figure 12H:
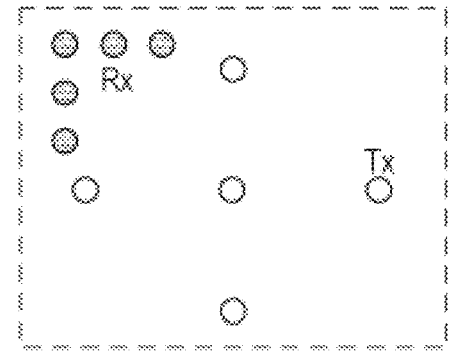
FIG. 12H illustrates an exemplary arrangement of transmitting antennas and receiving antennas according to Variation 3 of Embodiment 1 of the present disclosure.
Figure 12I:
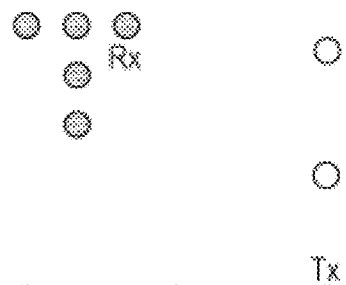
FIG. 12I illustrates an exemplary arrangement of transmitting antennas and receiving antennas according to Variation 3 of Embodiment 1 of the present disclosure.
Figure 12J:
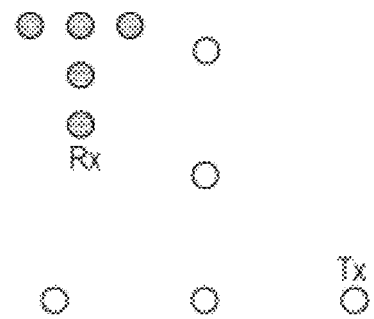
FIG. 12J illustrates an exemplary arrangement of transmitting antennas and receiving antennas according to Variation 3 of Embodiment 1 of the present disclosure.
Figure 12K:
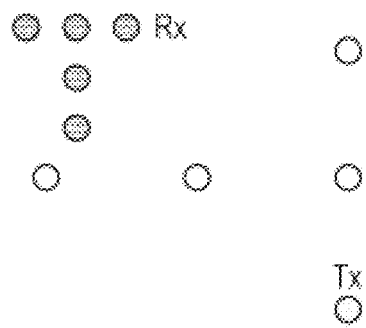
FIG. 12K illustrates an exemplary arrangement of transmitting antennas and receiving antennas according to Variation 3 of Embodiment 1 of the present disclosure.
Figure 12L:
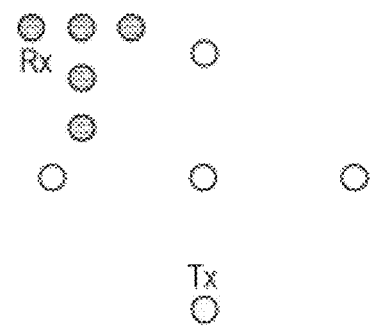
FIG. 12L illustrates an exemplary arrangement of transmitting antennas and receiving antennas according to Variation 3 of Embodiment 1 of the present disclosure.
Figure 12M:
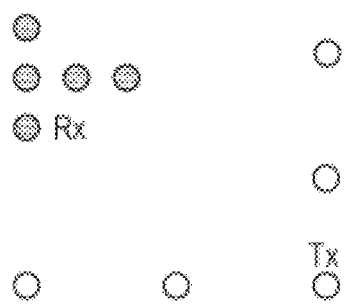
FIG. 12M illustrates an exemplary arrangement of transmitting antennas and receiving antennas according to Variation 3 of Embodiment 1 of the present disclosure.
Figure 12N:
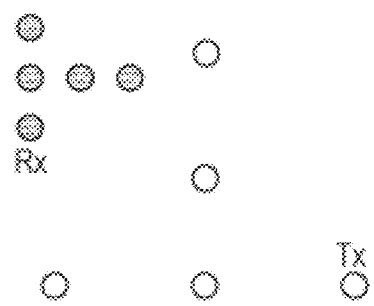
FIG. 12N illustrates an exemplary arrangement of transmitting antennas and receiving antennas according to Variation 3 of Embodiment 1 of the present disclosure.
Figure 12O:
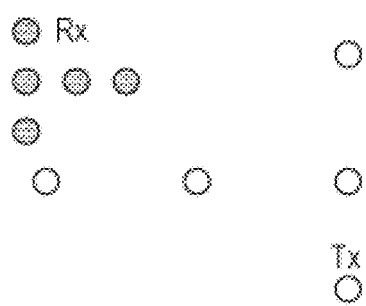
FIG. 12O illustrates an exemplary arrangement of transmitting antennas and receiving antennas according to Variation 3 of Embodiment 1 of the present disclosure.
Figure 12P:
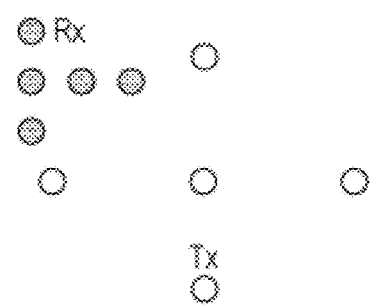
FIG. 12P illustrates an exemplary arrangement of transmitting antennas and receiving antennas according to Variation 3 of Embodiment 1 of the present disclosure.
Figures 13A, 13B, 13C, 13D:
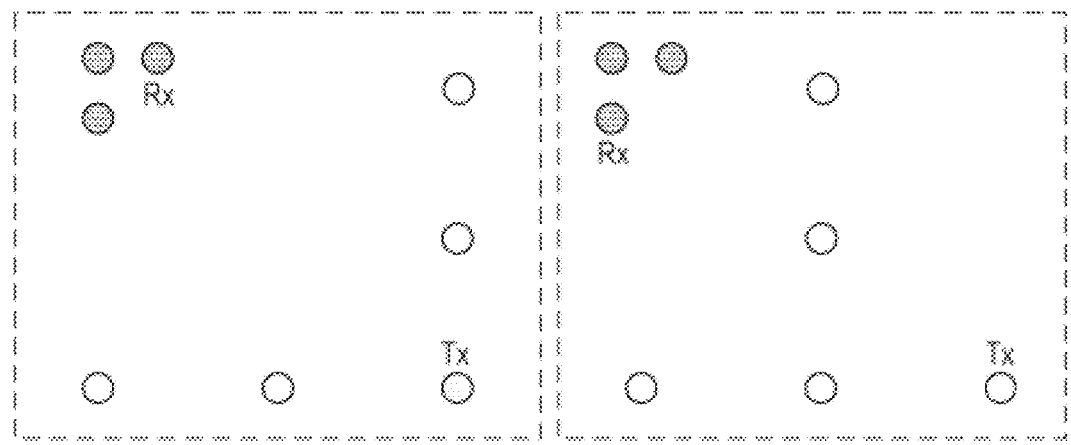
FIG. 13A illustrates an exemplary arrangement of transmitting antennas and receiving antennas according to Variation 3 of Embodiment 1 of the present disclosure.
FIG. 13B illustrates an exemplary arrangement of transmitting antennas and receiving antennas according to Variation 3 of Embodiment 1 of the present disclosure.
FIG. 13C illustrates an exemplary arrangement of transmitting antennas and receiving antennas according to Variation 3 of Embodiment 1 of the present disclosure.
FIG. 13D illustrates an exemplary arrangement of transmitting antennas and receiving antennas according to Variation 3 of Embodiment 1 of the present disclosure.

As another example, FIGS. 12A to 12P illustrate antenna arrangements of five transmitting antennas 106 and five receiving antennas 202. The transmitting antennas 106 are arranged in an L shape, a T shape, a lateral T shape, or a cross shape, and the receiving antennas 202 are arranged in an L shape, a T shape, a lateral T shape, or a cross shape.

As another example, FIGS. 13A to 13D illustrate antenna arrangements of five transmitting antennas 106 and three receiving antennas 202. The transmitting antennas 106 are arranged in an L shape, a T shape, a lateral T shape, or a cross shape, and the receiving antennas 202 are arranged in an L shape.

As another example, FIGS. 14A to 14D illustrate antenna arrangements of three transmitting antennas 106 and five receiving antennas 202. The transmitting antennas 106 are arranged in an L shape, and the receiving antennas 202 are arranged in an L shape, a T shape, a lateral T shape, and a cross shape.

The antenna arrangements illustrated in FIGS. 11A to 11D, 12A to 12P, 13A to 13D, and 14A to 14D provide the virtual receiving array having an arrangement in which the number of linearly arrayed virtual receiving antennas is maximized in the horizontal direction and the vertical direction. This achieves a maximized opening surface that includes the aperture length $D_H$ of the virtual receiving array in the horizontal direction and the aperture length $D_V$ thereof in the vertical direction.

The antenna arrangements illustrated in FIGS. 11A to 11D, 12A to 12P, 13A to 13D, and 14A to 14D may be vertically inverted arrangements of the L-shaped and T-shaped arrangements, and a laterally inverted arrangement of the lateral T-shaped arrangement (not illustrated).

Embodiment 2

In the radar device 10 (FIG. 3) according to Embodiment 1, the direction estimator 214 needs to calculate the direction estimation evaluating function value $P(\theta_u, \varphi_v, k, fs, w)$ by treating the azimuth direction $\theta_u$ and elevation direction $\varphi_v$ as variables at the predetermined angle intervals in the predetermined angle ranges.

For example, when the azimuth direction $\theta_u$ has NU+1 angle steps and the elevation direction $\varphi_v$ has NV+1 angle steps, the direction estimator 214 needs to calculate the direction estimation evaluating function value $P(\theta_u, \varphi_v, k, fs, w)$, (NU+1)×(NV+1) times. Accordingly, an enormous amount of calculation is needed to obtain the direction estimation evaluating function value $P(\theta_u, \varphi_v, k, fs, w)$ in a larger angle range.

The present embodiment describes a method of achieving a reduced calculation amount required for two-dimensional arrival angle estimation processing in the horizontal and vertical directions.

The radar device according to the present embodiment has the same basic configuration as that of the radar device 10 according to Embodiment 1, and thus is described with reference to FIG. 3. However, the direction estimation processing in the radar device 10 according to the present embodiment is different from that in the direction estimator 214 in Embodiment 1, and thus in the following, a direction estimator in this embodiment is denoted by reference numeral 214a.

Figure 15:
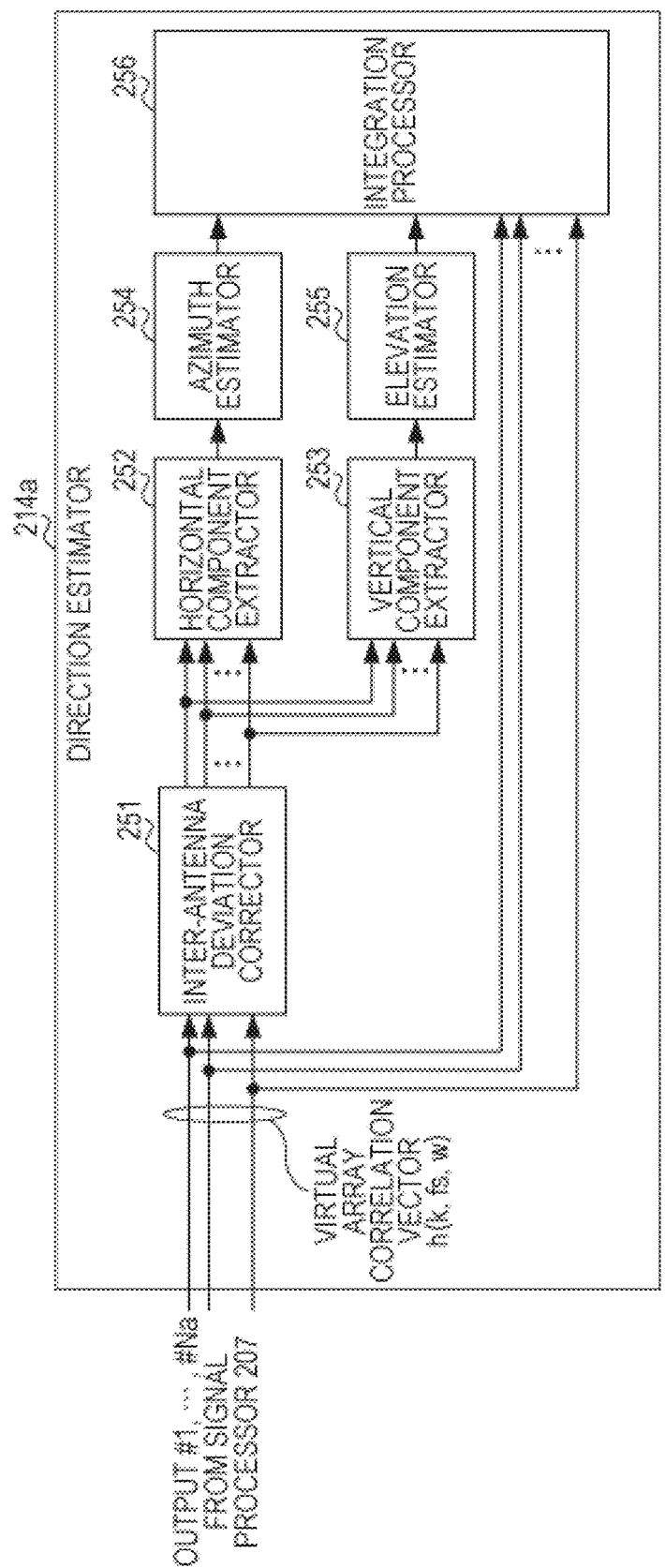
FIG. 15 is a block diagram of the internal configuration of a direction estimator according to Embodiment 2 of the present disclosure.

FIG. 15 is a block diagram of the internal configuration of the direction estimator 214a of the radar device 10 according to the present embodiment.

The direction estimator 214a includes an inter-antenna deviation corrector 251, a horizontal component extractor 252, a vertical component extractor 253, an azimuth estimator 254, an elevation estimator 255, and an integration processor 256.

The inter-antenna deviation corrector 251 multiplies the virtual receiving array correlation vector h(k, fs, w) of the w-th (w=1, . . . , Nt) Doppler frequency analyzer 213 output from the antenna system processors 201-1 to 201-Na by the array correction value $h\_cal_{[y]}$ that corrects phase and amplitude deviations between the transmitting array antennas and between the receiving array antenna, so as to calculate the virtual receiving array correlation vector $h\_{after\_cal}$(k, fs, w) in which the inter-antenna deviations are corrected. The virtual receiving array correlation vector $h\_{after\_cal}$(k, fs, w) is given by an expression below. Here, y=1, . . . , (Nt×Na).

$$h\_{after\_cal}(k, fs, w) = CA h(k, fs, w) \qquad (13)$$

$$CA = \begin{bmatrix} h\_cal_{[1]} & 0 & \cdots & 0 \\ 0 & h\_cal_{[2]} & \ddots & \cdots \\ \vdots & \ddots & \ddots & 0 \\ 0 & \cdots & 0 & h\_cal_{[Nt \times Na]} \end{bmatrix}$$

The horizontal component extractor 252 performs the following processing based on the virtual receiving array correlation vector $h\_{after\_cal}$(k, fs, w) in which the inter-antenna deviations are corrected by the inter-antenna deviation corrector 251.

Specifically, from Nt×Na elements (VA#1, . . . , VA#(Nt×Na)) as the product of the number Nt of the transmitting antennas 106 and the number Na of the receiving antennas 202 included in the virtual receiving array correlation vector $h\_{after\_cal}$(k, fs, w) in which the inter-antenna deviations are corrected, the horizontal component extractor 252 extracts virtual horizontal linear array elements included in a longest linear array (for example, a part enclosed by a straight line illustrated in FIGS. 7C and 9C) in the horizontal direction on the virtual receiving array. The horizontal component extractor 252 outputs a virtual horizontal linear array correlation vector $h_{LH}$(k, fs, w) including the extracted virtual horizontal linear array elements to the azimuth estimator 254.

Nth (Nt>Nth) antennas linearly arranged in the horizontal direction in the antenna arrangement of the Nt transmitting antennas 106 are denoted by Tx#$P_1$, Tx#$P_2$, . . . , Tx#$P_{Nth}$ from the left. Nah (Na>Nah) antennas linearly arranged in the horizontal direction in the antenna arrangement of the Na receiving antennas 202 are denoted by Rx#$Q_1$, Rx#$Q_2$, . . . , Rx#$Q_{Nah}$ from the left.

In this case, the virtual horizontal linear array correlation vector $h_{LH}$(k, fs, w) includes Nth×Nah elements given in expressions below.

$VA\#((Q_1-1)Nt+P_1), VA\#((Q_2-1)Nt+P_1), \ldots, VA\#((Q_{Nah}-1)Nt+P_1),$ $VA\#((Q_1-1)Nt+P_2), VA\#((Q_2-1)Nt+P_2), \ldots, VA\#((Q_{Nah}-1)Nt+P_2), \ldots,$ $VA\#((Q_1-1)Nt+P_{Nth}), VA\#((Q_2-1)Nt+P_{Nth}), \ldots, VA\#((Q_{Nah}-1)Nt+P_{Nth}) \qquad (14)$ For example, in the antenna arrangement illustrated in FIGS. 7A and 7B or FIGS. 9A and 9B, $P_1$, $P_2$, and $P_3$ are 1, 2, and 3, respectively, and $Q_1$, $Q_2$, and $Q_3$ are 1, 2, and 3, respectively. Thus, the virtual horizontal linear array correlation vector $h_{LH}$(k, fs, w) includes VA#1, VA#6, VA#11, VA#2, VA#7, VA#12, VA#3, VA#8, and VA#13 elements.

As described above, from the output ($h\_{after\_cal}$(k, fs, w)) of the Doppler frequency analysis processing on the radar transmission signals transmitted from the transmitting antennas 106-1 to 106-Nt for the reflected wave signals received by the receiving antennas 202-1 to 202-Na, the horizontal component extractor 252 extracts components of virtual antenna elements linearly arranged in the horizontal direction, the number of the virtual antenna elements being equal to the product of the maximum number Nth of the transmitting antennas 106 linearly arranged in the horizontal direction and the maximum number Nah of the receiving antennas 202 linearly arranged in the horizontal direction in the virtual receiving array (Nt×Na elements).

The vertical component extractor 253 performs the following processing based on the virtual receiving array correlation vector h_after_cal(k, fs, w) in which the inter-antenna deviations are corrected by the inter-antenna deviation corrector 251.

Specifically, from Nt×Na elements (VA#1, ..., VA#(Nt×Na)) as the product of the number Nt of the transmitting antennas 106 and the number Na of the receiving antennas 202 included in the virtual receiving array correlation vector h_after_cal(k, fs, w) in which the inter-antenna deviations are corrected, the vertical component extractor 253 extracts virtual vertical linear array elements included in a longest linear array (for example, a part enclosed by a dashed line illustrated in FIGS. 7C and 9C) in the vertical direction on the virtual receiving array. The vertical component extractor 253 outputs a virtual vertical linear array correlation vector $h_{LV}$(k, fs, w) including the extracted virtual vertical linear array elements to the elevation estimator 255.

Ntv (Nt>Ntv) antennas linearly arranged in the vertical direction in the antenna arrangement of the Nt transmitting antennas 106 are denoted by Tx#$R_1$, Tx#$R_2$, ..., Tx#$R_{Ntv}$ from the top. Nav (Na>Nav) antennas linearly arranged in the vertical direction in the antenna arrangement of the Na receiving antennas 202 are denoted by Rx#$S_1$, Rx#$S_2$, ..., Rx#$S_{Nav}$ from the top.

In this case, the virtual vertical linear array correlation vector $h_{LV}$(k, fs, w) includes Ntv×$Nav_v$ elements given in expressions below.

$$VA\#((S_1-1)Nt+R_1), VA\#((S_2-1)Nt+R_1), \ldots, VA\#((S_{Nav}-1)Nt+R_1),$$

$$VA\#((S_1-1)Nt+R_2), VA\#((S_2-1)Nt+R_2), \ldots, VA\#((S_{Nav}-1)Nt+R_2), \ldots,$$

$$VA\#((S_1-1)Nt+R_{Ntv}), VA\#((S_2-1)Nt+R_{Ntv}), \ldots, VA\#((S_{Nav}-1)Nt+R_{Ntv}) \quad (15)$$

For example, in the antenna arrangements illustrated in FIGS. 7A and 7B, $R_1$, $R_2$, and $R_3$ are 3, 4, and 5, respectively, and $S_1$ and $S_2$ are 4 and 2, respectively. Thus the virtual vertical linear array correlation vector $h_{LV}$(k, fs, w) includes VA#18, VA#8, VA#19, VA#9, VA#20, and VA#10 elements.

Similarly, in the antenna arrangement illustrated in FIGS. 9A and 9B, $R_1$, $R_2$, and $R_3$ are 3, 4, and 5, respectively, and $S_1$ and $S_2$ are 4 and 1, respectively. Thus the virtual vertical linear array correlation vector $h_{LV}$(k, fs, w) includes VA#18, VA#3, VA#19, VA#4, VA#20, and VA#5 elements.

As described above, from the output (h_after_cal(k, fs, w)) of the Doppler frequency analysis processing on the radar transmission signals transmitted from the transmitting antennas 106-1 to 106-Nt for the reflected wave signals received by the receiving antennas 202-1 to 202-Na, the vertical component extractor 253 extracts components of virtual antenna elements linearly arranged in the vertical direction in the virtual receiving array (Nt×Na elements), the number of the virtual antenna elements being equal to the product of the maximum number Ntv of the transmitting antennas 106 linearly arranged in the vertical direction and the maximum number Nav of the receiving antennas 202 linearly arranged in the vertical direction.

Using the virtual horizontal linear array correlation vector $h_{LH}$(k, fs, w) output from the horizontal component extractor 252, the azimuth estimator 254 calculates a space profile by treating the azimuth direction θ of an azimuth estimation evaluating function value $P_H$(θ, k, fs, w) as a variable in the predetermined angle range, and then extracts a predetermined number Nph of local maximum peaks of the calculated space profile in descending order.

Then, the azimuth estimator 254 outputs the azimuth directions $θ_{peak(1)}$(k, fs, w), $θ_{peak(2)}$(k, fs, w), ..., $θ_{peak(Nph)}$(k, fs, w) corresponding to the Nph local maximum peaks to the integration processor 256 as arrival direction estimation values (arrival direction candidates) of the azimuth direction.

Different kinds of the azimuth estimation evaluating function value $P_H(θ_u, k, fs, w)$ are provided by different arrival direction estimation algorithms. For example, the estimation method using an array antenna disclosed in Cadzow described above may be used. For example, the Fourier beamformer method can be expressed in an expression below. Alternatively, the Capon and MUSIC methods are applicable as well.

$$P(θ_u, k, fs, w) = |a\_LH(θ_u)^H h_{LH}(k, fs, w)|^2 \quad (16)$$

In this expression, a superscript H is the Hermite transposition operator, and a_LH($θ_u$) represents the directional vector of the virtual receiving array for arrival wave in the azimuth direction $θ_u$.

The directional vector a_LH($θ_u$) of the virtual horizontal linear array is a (Nth×Nah) column vector including an element as a complex response of the virtual receiving array when a reflected wave of the radar transmission signal arrives in the $θ_u$ direction. The complex response a_LH($θ_u$) of the virtual receiving array represents a phase difference geometric-optically calculated depending on an element spacing between antennas.

Figure 16:
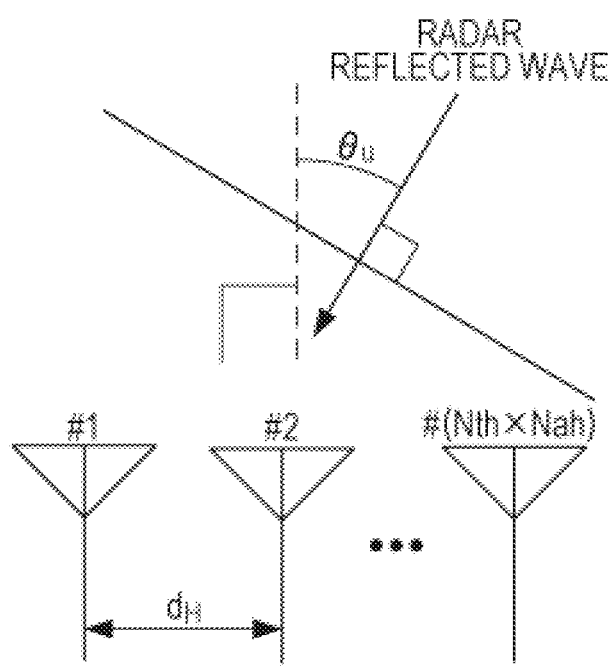
FIG. 16 illustrates a relation between an array antenna arrangement and an arrival angle in the horizontal direction.

For example, when elements of an array antenna are linearly arranged at an equal element spacing of $d_H$ as illustrated in FIG. 16, the directional vector a_LH($θ_u$) can be expressed in an expression below.

$$a_{\_LH}(θ_u) = \begin{bmatrix} 1 \\ \exp\{j2πd_H \sin θ_u / λ\} \\ \vdots \\ \exp\{j2π(N_a - 1)d_H \sin θ_u / λ\} \end{bmatrix} \quad (17)$$

In this expression, $θ_u$ takes values separated by a predetermined azimuth spacing $β_H$ in an azimuth range in which the arrival direction estimation is to be performed. For example, $θ_u$ is set as described below.

$$θ_u = θmin + uβ_H \text{ where } u=0, \ldots, NU$$

$$NU = \text{floor}[(θmax - θmin)/β_H] + 1$$

In this expression, floor(x) is a function that returns a largest integer value not larger than a real number x.

The present embodiment assumes that the directional vector a_LH($θ_u$) is previously calculated based on a virtual horizontal linear array arrangement.

Figure 17:
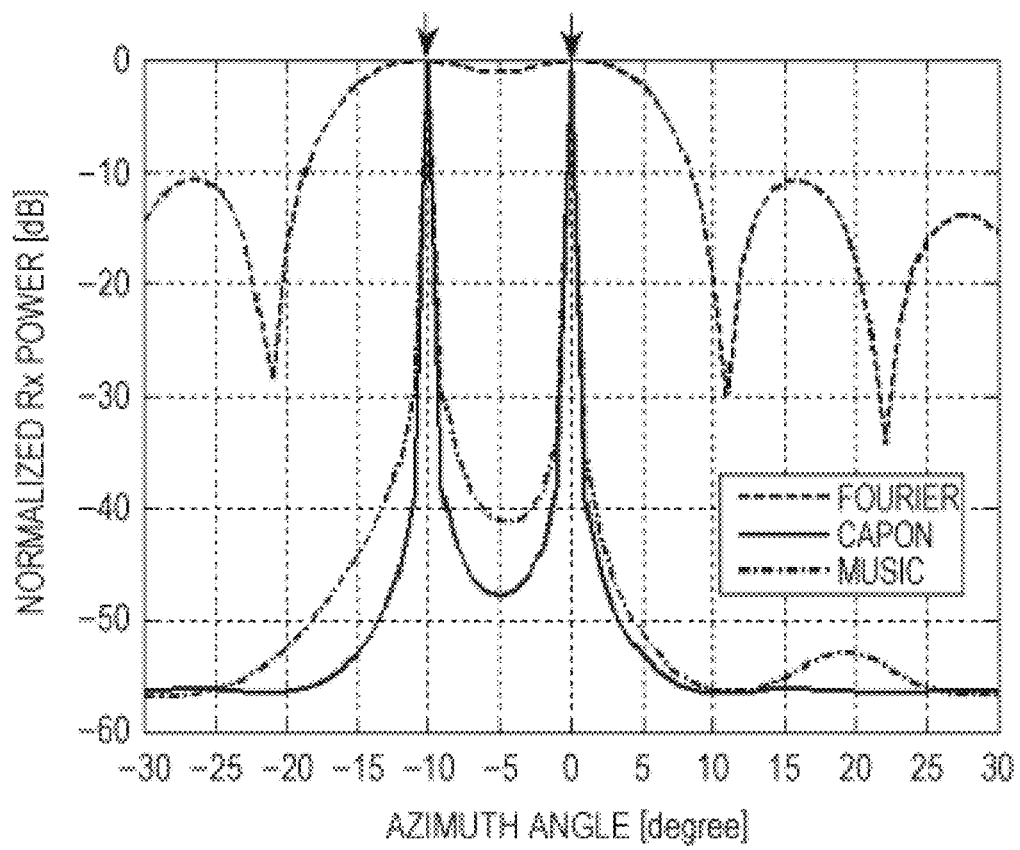
FIG. 17 illustrates an exemplary result of estimation of an arrival wave direction in the horizontal direction according to Embodiment 2 of the present disclosure.

FIG. 17 illustrates an exemplary result of the azimuth estimation in the azimuth estimator 254. FIG. 17 illustrates exemplary results obtained by using the Capon and MUSIC methods as well as the Fourier beamformer method (Fourier) used by the azimuth estimator 254.

As illustrated in FIG. 17, the azimuth estimator 254 outputs the directions (0° and −10°) of two (Nph=2) peaks in descending order among some local maximum peaks as a result of the azimuth estimation by the Fourier beamformer method (Fourier), as the arrival direction estimation values $\theta_{peak(1)}(k, fs, w)$ and $\theta_{peak(2)}(k, fs, w)$ in the azimuth direction.

In FIG. 17, the peak directions (0° and −10°) output as the arrival direction estimation values $\theta_{peak(1)}(k, fs, w)$ and $\theta_{peak(2)}(k, fs, w)$ in the azimuth direction coincide with peak directions when the Capon and MUSIC methods are used.

Using the virtual vertical linear array correlation vector $h_{LV}(k, fs, w)$ output from the vertical component extractor 253, the elevation estimator 255 calculates a space profile by treating the elevation direction $\varphi$ of an elevation estimation evaluating function value $P_V(\varphi, k, fs, w)$ as a variable in a predetermined angle range, and then extracts a predetermined number Npv of local maximum peaks of the calculated space profile in descending order.

Then, the elevation estimator 255 outputs the elevation directions $\Phi_{peak(1)}(k, fs, w)$, $\Phi_{peak(2)}(k, fs, w)$, ..., $\Phi_{peak(Npv)}(k, fs, w)$ corresponding to the Npv local maximum peaks to the integration processor 256 as arrival direction estimation values (arrival direction candidate) for the elevation direction.

Different kinds of the elevation estimation evaluating function value $P_V(\varphi_v, k, fs, w)$ are provided by different arrival direction estimation algorithms. For example, the estimation method using an array antenna disclosed in Cadzow described above may be used. For example, the Fourier beamformer method can be expressed in an expression below. Alternatively, the Capon and MUSIC methods are applicable as well.

$$P_V(\varphi_v, k, fs, w) = |a\_{LH}(\varphi_v)^H h_{LV}(k, fs, w)|^2 \quad (18)$$

In this expression, a superscript H represents the Hermite transposition operator, and $a\_{LH}(\varphi_v)$ represents the directional vector of the virtual receiving array for arrival wave in the elevation direction $\varphi_v$.

The directional vector $a\_{LH}(\varphi_v)$ of the virtual vertical linear array is a (Ntv×Nav) column vector including an element as a complex response of the virtual receiving array when a reflected wave of the radar transmission signal arrives in the $\varphi_v$ direction. The complex response $a\_{LH}(\varphi_v)$ of the virtual receiving array represents a phase difference geometric-optically calculated depending on an element spacing between antennas.

Figure 18:
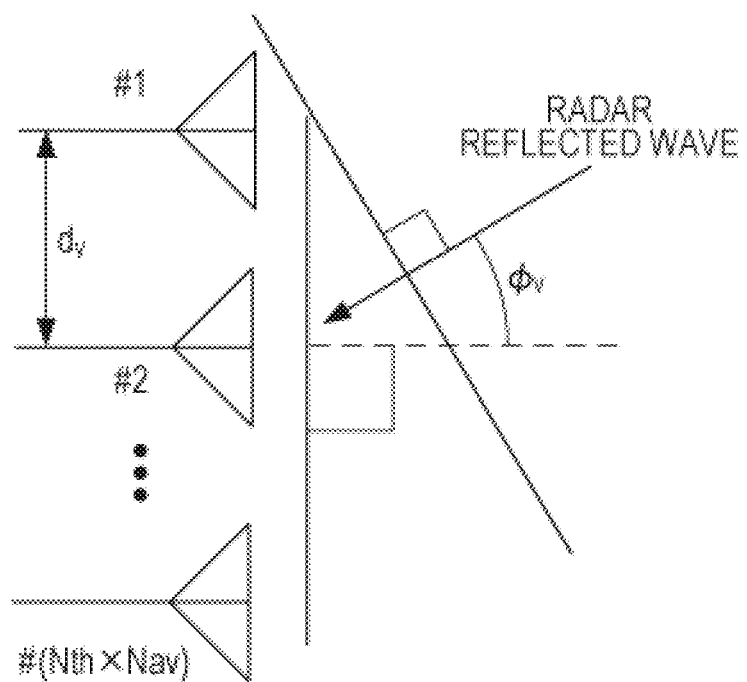
FIG. 18 illustrates the relation between the array antenna arrangement and the arrival angle in the horizontal direction.

For example, when elements of an array antenna are linearly arranged at an equal spacing of $d_V$ as illustrated in FIG. 18, the directional vector $a\_{LH}(\varphi_v)$ can be expressed in an expression below.

$$a\_{LV}(\theta_v) = \begin{bmatrix} 1 \\ \exp\{j2\pi d_V \sin\theta_v / \lambda\} \\ \vdots \\ \exp\{-j2\pi(N_a-1)d_V \sin\theta_v / \lambda\} \end{bmatrix} \quad (19)$$

In this expression, $\varphi_v$ takes values separated by a predetermined elevation spacing $\beta_V$ in an elevation angle range in which the arrival direction estimation is to be performed. For example, $\varphi_v$ is set as described below.

$\varphi_v = \varphi\min + v\beta_V$ where $v=0, \ldots, NV$ $NV = \text{floor}[(\varphi\max - \varphi\min)/\beta_V] + 1$ In this expression, floor(x) is a function that returns a largest integer value not larger than a real number x.

The present embodiment assumes that the directional vector $a\_{LH}(\varphi_v)$ is previously calculated based on a virtual vertical linear array arrangement.

Figure 19:
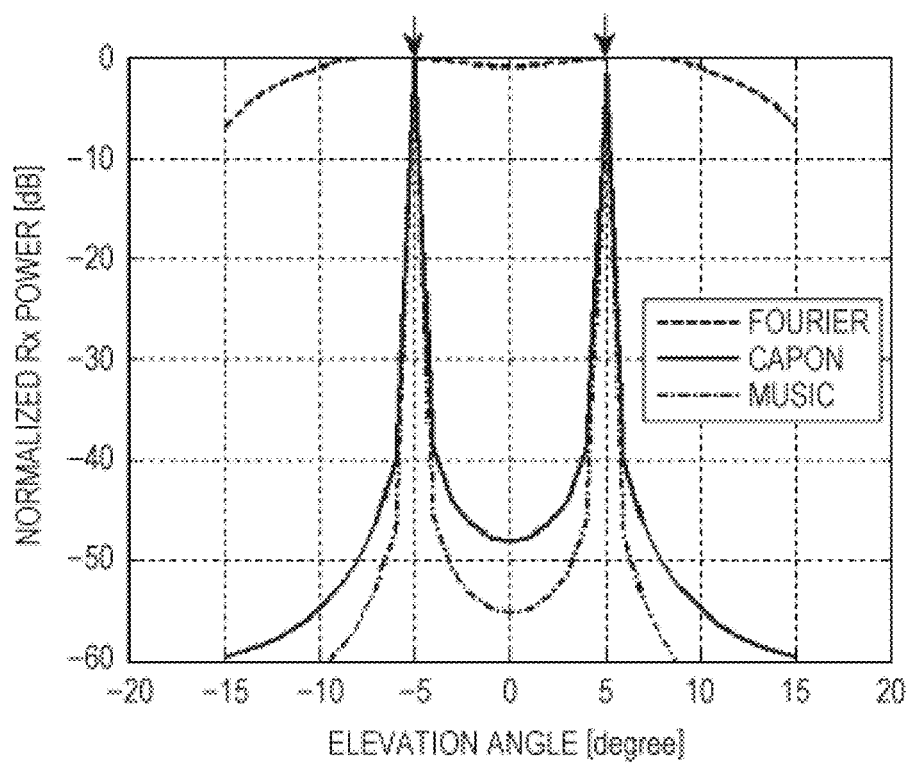
FIG. 19 illustrates an exemplary result of estimation of the arrival wave direction in the vertical direction according to Embodiment 2 of the present disclosure.

FIG. 19 illustrates an exemplary result of the elevation estimation in the elevation estimator 255. FIG. 19 illustrates exemplary results obtained by using the Capon and MUSIC methods as well as the Fourier beamformer method (Fourier) used by the elevation estimator 255.

As illustrated in FIG. 19, the elevation estimator 255 outputs the directions (5° and −5°) of two (Npv=2) peaks in descending order among some local maximum peaks as a result of the elevation estimation by the Fourier beamformer method (Fourier), as the arrival direction estimation values $\Phi_{peak(1)}(k, fs, w)$ and $\Phi_{peak(2)}(k, fs, w)$ for the elevation direction.

In FIG. 19, the peak directions (5° and −5°) output as the arrival direction estimation values $\Phi_{peak(1)}(k, fs, w)$ and $\Phi_{peak(2)}(k, fs, w)$ for the elevation direction coincide with peak directions when the Capon and MUSIC methods are used.

Using the azimuth directions $\theta_{peak(1)}(k, fs, w)$, $\theta_{peak(2)}(k, fs, w)$, ..., $\theta_{peak(Nph)}(k, fs, w)$ of local maximum peaks, which are output from the azimuth estimator 254, and the elevation directions $\Phi_{peak(1)}(k, fs, w)$, $\Phi_{peak(2)}(k, fs, w)$, ..., $\Phi_{peak(Npv)}(k, fs, w)$ of local maximum peaks, which are output from the elevation estimator 255, the integration processor 256 performs the following processing.

Specifically, the integration processor 256 calculates likelihood values for all combinations ($\theta_{peak(xh)}(k, fs, w)$ and $\Phi_{peak(xv)}(k, fs, w)$) of pairs of the Nph azimuth directions (arrival direction candidates in the azimuth direction) estimated by the azimuth estimator 254 and the Npv elevation directions (arrival direction candidates in the elevation direction) estimated by the elevation estimator 255. In other words, the integration processor 256 calculates the likelihood values of the pairs in (Npv×Nph) combinations. Here, xh=1, ..., Nph, and xv=1, ..., Npv.

The integration processor 256 outputs a predetermined number of pairs having high calculated likelihood values among the pairs of the (Npv×Nph) combinations, as a measurement result (arrival direction estimation values of the reflected wave signal in the azimuth and elevation directions).

The integration processor 256 outputs the calculated arrival direction estimation values (the above combinations), the discrete time k as calculation timing, and the Doppler frequency fsΔΦ, as a radar positioning result.

The integration processor 256 uses a Fourier beam reception electric power of the virtual receiving array in the direction of $\theta_{peak(xh)}(k, fs, w)$ and $\Phi_{peak(xv)}(k, fs, w)$ as the likelihood value of a pair of the arrival direction estimation value for the azimuth direction and the arrival direction estimation value for the elevation direction, as indicated in an expression below.

$$P(\theta_{peak(xh)}, \Phi_{peak(xv)}, k, fs, w) = |a(\theta_{peak(xh)}, \Phi_{peak(xv)})^H h\_{after\_cal}(k, fs, w)|^2 \quad (20)$$

In this expression, $a(\theta_u, \varphi_v)$ represents the directional vector of the virtual receiving array for an arrival wave in the azimuth direction $\theta_u$ and the elevation direction $\varphi_v$.

Figure 20:
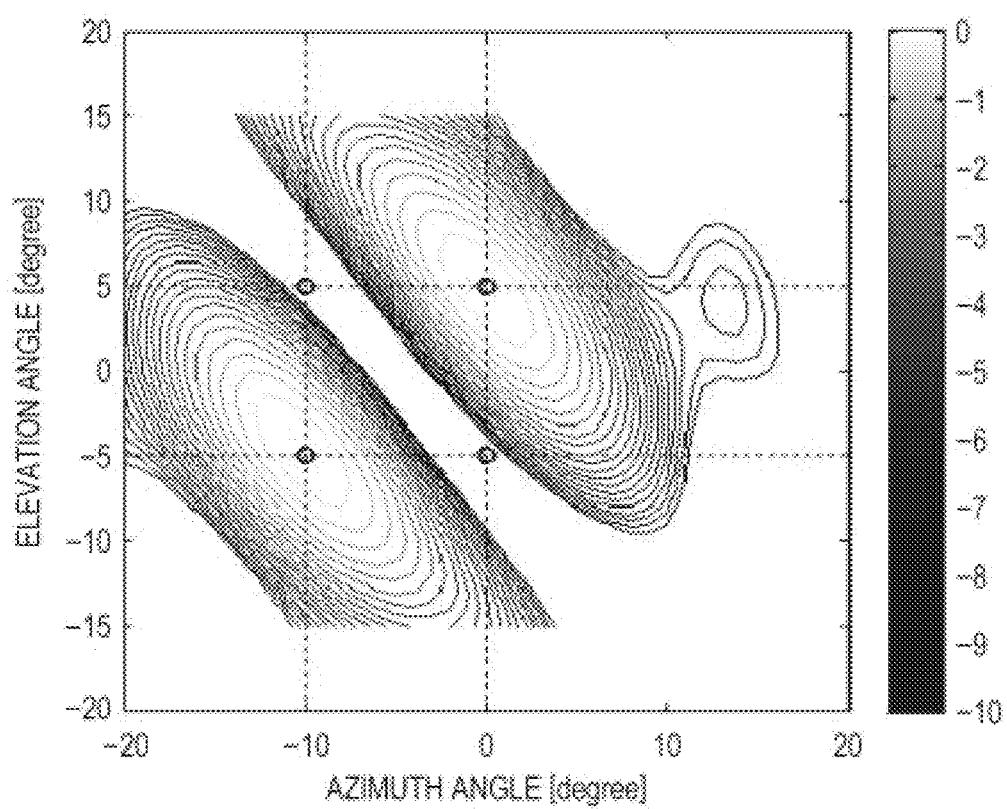
FIG. 20 illustrates an exemplary result of estimation of the arrival wave direction in the horizontal direction and the vertical direction according to Embodiment 2 of the present disclosure.

FIG. 20 illustrates an exemplary result of the processing at the integration processor 256.

FIG. 20 illustrates a case in which the azimuth estimator 254 and the elevation estimator 255 each output two estimation results (arrival direction estimation values) for the azimuth and elevation directions. Specifically, the azimuth estimator 254 outputs azimuth angles of 0° and −10° as an estimation result as illustrated in FIG. 17, and the elevation estimator 255 outputs elevation angles of 5° and −5° as an estimation result as illustrated in FIG. 19. Although FIG. 20 is a contour plot of the likelihood value calculated in a range of ±20° of the azimuth direction and the vertical direction for reference, the integration processor 256 does not require such calculation processing.

The integration processor 256 calculates likelihood values for all combinations ($\theta_{peak(xh)}$(k, fs, w) and $\Phi_{peak(xv)}$(k, fs, w)) of pairs of the estimated azimuth and elevation directions. In FIG. 20, the integration processor 256 calculates the likelihood values of four (=2×2) pairs of (azimuth angle, elevation angle) of (0°, 5°), (0°, −5°), (−10°, 5°), and (−10°, −5°).

Consequently, as illustrated in FIG. 20, the integration processor 256 outputs the estimation results of two pairs having high likelihood values (azimuth angle, elevation angle)=(0°, 5°) and (−10°, −5°).

Thus, the direction estimator 214a performs the processing of estimating the arrival direction estimation value in each of the horizontal and vertical directions as the estimation processing in one-dimensional direction. The integration processor 256 only needs to calculate the likelihood value for all combinations of Nph estimation results for the horizontal direction and Npv estimation results for the vertical direction, that is, (Npv×Nph) times.

Thus, the present embodiment can achieve a largely reduced calculation amount of two-dimensional arrival direction estimation as compared to calculation of the likelihood values for all pairs of the azimuth and elevation angles in the azimuth angle and elevation angle ranges.

The above has described the embodiment according to an aspect of the present disclosure.

The operations according to the embodiments and variations may be performed in combination as appropriate.

Although the embodiments describes a case of using a coded pulse radar, the present disclosure is also applicable to a radar type such as a chirp pulse radar using frequency-modulated pulsed waves.

In the radar device 10 illustrated in FIG. 3, the radar transmitter 100 and the radar receiver 200 may be individually arranged at physically separated locations.

The radar device 10 includes, although not illustrated, a central processing unit (CPU), a storage medium such as a read only memory (ROM) storing a control program, and, and a working memory such as a random access memory (RAM). With this configuration, the function of each component described above is achieved through execution of the control program by the CPU. The hardware configuration of the radar device 10 is, however, not limited thereto. For example, each functional component of the radar device 10 may be achieved as an integrated circuit (IC). The functional components may be provided as individual chips, or part or all thereof may be included in a single chip.

SUMMARY OF THE PRESENT DISCLOSURE

A radar device according to the present disclosure includes radar transmission circuitry which, in operation, transmits Nt radar signals through Nt transmitting antennas at each predetermined transmission period, where Nt is an integer of three or greater; and radar reception circuitry which, in operation, receives and performs Doppler frequency analysis processing on at least one reflected wave signal which is of the Nt radar signals transmitted and reflected by an object through Na receiving antennas, where Na is an integer of three or greater. The Nt transmitting antennas include Nt1 transmitting antennas arranged at a first spacing on a first straight line, and (Nt+1−Nt1) transmitting antennas arranged at a second spacing on a second straight line orthogonal to the first straight line, where Nt1 is an integer that satisfies Nt>Nt1. The integer Nt1 is a value that maximizes Nt1×(Nt+1−Nt1). The Na receiving antennas include Na1 receiving antennas arranged at a third spacing on the first straight line, and (Na+1−Na1) receiving antennas arranged at a fourth spacing on the second straight line, where Na1 is an integer that satisfies Na>Na1. The integer Na1 is a value that maximizes Na1×(Na+1−Na1).

In the radar device according to the present disclosure, the third spacing is larger than the fourth spacing when (Nt1×Na1)<(Nt+1−Nt1)×(Na+1−Na1) is satisfied, and the third spacing is smaller than the fourth spacing when (Nt1×Na1)>(Nt+1−Nt1)×(Na+1−Na1) is satisfied.

In the radar device according to the present disclosure, the third spacing and the fourth spacing are shorter than a wavelength of the radar signal.

In the radar device according to the present disclosure, the radar reception circuitry includes: first direction component extraction circuitry which, in operation, extracts components of Nt1×Na1 virtual antenna elements arranged on the first straight line in a virtual receiving array of Nt×Na virtual antenna elements from an output of the Doppler frequency analysis processing; second direction component extraction circuitry which, in operation, extracts components of (Nt+1−Nt1)×(Na+1−Na1) virtual antenna elements arranged on the second straight line in the virtual receiving array of the Nt×Na virtual antenna elements from an output of the Doppler frequency analysis processing; azimuth estimation circuitry which, in operation, estimates a predetermined number of arrival direction candidates in an azimuth direction based on the components of the Nt1×Na1 virtual antenna elements; elevation estimation circuitry which, in operation, estimates a predetermined number of arrival direction candidates in an elevation direction based on the components of the (Nt+1−Nt1)×(Na+1−Na1) virtual antenna elements; and integration processing circuitry which, in operation, calculates a likelihood value for each combination of pairs of the arrival direction candidates in the azimuth direction and the arrival direction candidates in the elevation direction and outputs an arrival direction estimation value of the reflected wave signal in the azimuth direction and the elevation direction based on the likelihood value.

While the various embodiments have been described above with reference to the drawings, it is to be understood that the present disclosure is not limited to the disclosed exemplary embodiments. It is clear that the skilled person in the art could think of various modifications or corrections within the scope of the claims, which are understood to belong to the technical range of the present disclosure. The components described in the embodiments may be optionally combined without departing from the spirit of the disclosure.

The present disclosure has an exemplary configuration using hardware in the embodiments described above, but is achievable with software in combination with hardware.

Each functional block used in the description of the embodiments is typically achieved as an LSI, which is an integrated circuit. The integrated circuit may control the functional block used in the description of the embodiments, and include an input and an output. These integrated circuits may be provided as individual chips, or part or all thereof may be included in a single chip. The LSI may be called an IC, system LSI, super LSI, or ultra LSI depending on its density of integration.

A method of the integration is not limited to LSI, but may be achieved using a dedicated circuit or a general-purpose processor. The integration may be achieved using a field programmable gate array (FPGA), which is programmable after LSI manufacturing, or a reconfigurable processor, in which connection or setting of circuit cells inside the LSI is reconfigurable.

Moreover, any novel integration technology provided to replace LSI by the progress of the semiconductor technology or any technology deriving therefrom may be used for integration of a functional block. A possible replacement is, for example, an application of biotechnology.

The present disclosure provides a preferable radar device that performs detection in a wide-angle range.

What is claimed is:

1. A radar device comprising:
    radar transmission circuitry which, in operation, transmits Nt radar signals through Nt transmitting antennas at each predetermined transmission period, wherein Nt is an integer that is three or greater than three; and
    radar reception circuitry which, in operation, receives, through Na receiving antennas, and performs Doppler frequency analysis processing on at least one reflected wave signal which is of the Nt radar signals transmitted and reflected by an object, wherein Na is an integer that is three or greater than three, wherein:
    the Nt transmitting antennas include:
        Nt1 transmitting antennas arranged on a first straight line with a first spacing therebetween, and
        (Nt+1−Nt1) transmitting antennas arranged on a second straight line with a second spacing therebetween, the second straight line being orthogonal to the first straight line, wherein Nt1 is an integer that satisfies Nt>Nt1;
    at least one transmitting antenna of the Nt transmitting antennas is arranged simultaneously on the first straight line and on the second straight line;
    the integer Nt1 maximizes Nt1×(Nt+1−Nt1);
    the Na receiving antennas include:
        Na1 receiving antennas arranged on the first straight line with a third spacing therebetween, wherein Na1 is an integer that satisfies Na>Na1, and
        (Na+1−Na1) receiving antennas arranged on the second straight line with a fourth spacing therebetween;
    at least one receiving antenna of the Na receiving antennas is arranged simultaneously on the first straight line and on the second straight line; and
    the integer Na1 maximizes Na1×(Na+1−Na1).

2. The radar device according to claim 1, wherein
    the third spacing is larger than the fourth spacing when (Nt1×Na1)<(Nt+1−Nt1)×(Na+1−Na1) is satisfied, and
    the third spacing is smaller than the fourth spacing when (Nt1×Na1)>(Nt+1−Nt1)×(Na+1−Na1) is satisfied.

3. The radar device according to claim 1, wherein the third spacing and the fourth spacing are shorter than a wavelength of the radar signal.

4. The radar device according to claim 1, wherein the radar reception circuitry includes:
    first direction component extraction circuitry which, in operation, extracts components of Nt1×Na1 virtual antenna elements arranged on the first straight line in a virtual receiving array of Nt×Na virtual antenna elements from an output of the Doppler frequency analysis processing;
    second direction component extraction circuitry which, in operation, extracts components of (Nt+1−Nt1)×(Na+1−Na1) virtual antenna elements arranged on the second straight line in the virtual receiving array of the Nt×Na virtual antenna elements from the output of the Doppler frequency analysis processing;
    azimuth estimation circuitry which, in operation, estimates a predetermined number of arrival direction candidates in an azimuth direction based on the components of the Nt1×Na1 virtual antenna elements;
    elevation estimation circuitry which, in operation, estimates a predetermined number of arrival direction candidates in an elevation direction based on the components of the (Nt+1−Nt1)×(Na+1−Na1) virtual antenna elements; and
    integration processing circuitry which, in operation, calculates a likelihood value for each combination of pairs of the arrival direction candidates in the azimuth direction and the arrival direction candidates in the elevation direction and outputs an arrival direction estimation value of the reflected wave signal in the azimuth direction and the elevation direction based on the likelihood value.

* * * * *